(12) United States Patent
Sasaki et al.

(10) Patent No.: US 8,075,405 B2
(45) Date of Patent: Dec. 13, 2011

(54) NETWORK GAME SYSTEM AND NETWORK GAME PROGRAM

(75) Inventors: Tetsuya Sasaki, Kyoto (JP); Tsutomu Araki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1539 days.

(21) Appl. No.: 11/487,455

(22) Filed: Jul. 17, 2006

(65) Prior Publication Data

US 2007/0111797 A1 May 17, 2007

(30) Foreign Application Priority Data

Nov. 11, 2005 (JP) ................................. 2005-328148

(51) Int. Cl.
*A63F 9/00* (2006.01)
(52) U.S. Cl. ......................................................... 463/42
(58) Field of Classification Search ................... 463/42; 709/228
See application file for complete search history.

(56) References Cited

U.S. PATENT DOCUMENTS

| | | | | |
|---|---|---|---|---|
| 5,668,950 | A * | 9/1997 | Kikuchi et al. | 709/217 |
| 6,701,344 | B1 * | 3/2004 | Holt et al. | 709/204 |
| 7,353,252 | B1 * | 4/2008 | Yang et al. | 709/204 |
| 7,373,380 | B2 * | 5/2008 | Datta | 709/205 |
| 7,392,422 | B2 * | 6/2008 | Van Datta et al. | 714/4 |
| 7,421,471 | B2 * | 9/2008 | Van Datta | 709/205 |
| 7,460,495 | B2 * | 12/2008 | Li | 370/267 |
| 7,603,441 | B2 * | 10/2009 | Synek et al. | 709/220 |
| 7,668,972 | B2 * | 2/2010 | Newson et al. | 709/240 |
| 2001/0044339 | A1 * | 11/2001 | Cordero et al. | 463/42 |
| 2002/0111996 | A1 * | 8/2002 | Jones et al. | 709/203 |
| 2003/0217158 | A1 * | 11/2003 | Datta | 709/228 |
| 2004/0162144 | A1 * | 8/2004 | Loose et al. | 463/42 |
| 2005/0007964 | A1 * | 1/2005 | Falco et al. | 370/256 |
| 2005/0181877 | A1 * | 8/2005 | Kuwahara et al. | 463/42 |
| 2006/0092942 | A1 * | 5/2006 | Newson et al. | 370/392 |
| 2006/0187860 | A1 * | 8/2006 | Li | 370/260 |
| 2006/0247059 | A1 * | 11/2006 | Nogami et al. | 463/42 |
| 2008/0004117 | A1 * | 1/2008 | Stamper et al. | 463/42 |
| 2008/0220874 | A1 * | 9/2008 | Tatsumi et al. | 463/42 |
| 2009/0197682 | A1 * | 8/2009 | Sotoike et al. | 463/42 |
| 2010/0124992 | A1 * | 5/2010 | Park et al. | 463/42 |

OTHER PUBLICATIONS

Wun-Chul, "Online Game Programming", SOFTBANK Publishing, Inc. Mar. 3 2005, pp. 218-222, with English translation.

* cited by examiner

*Primary Examiner* — Melba Bumgarner
*Assistant Examiner* — Seng H Lim
(74) *Attorney, Agent, or Firm* — Nixon & Vanderhye P.C.

(57) ABSTRACT

A host terminal, to which a client terminal is connected, transmits a connection request to another host terminal to which another client terminal is connected. When the connection request is accepted, the host terminal, which is a source of the connection request, disconnects a connection between the host terminal and the client terminal, and then the host terminal is connected, as a client terminal, to said another host terminal which is a destination of the connection request. This prevents users from waiting for a long time, and allows a peer-to-peer network to be efficiently established.

12 Claims, 17 Drawing Sheets

F I G. 1
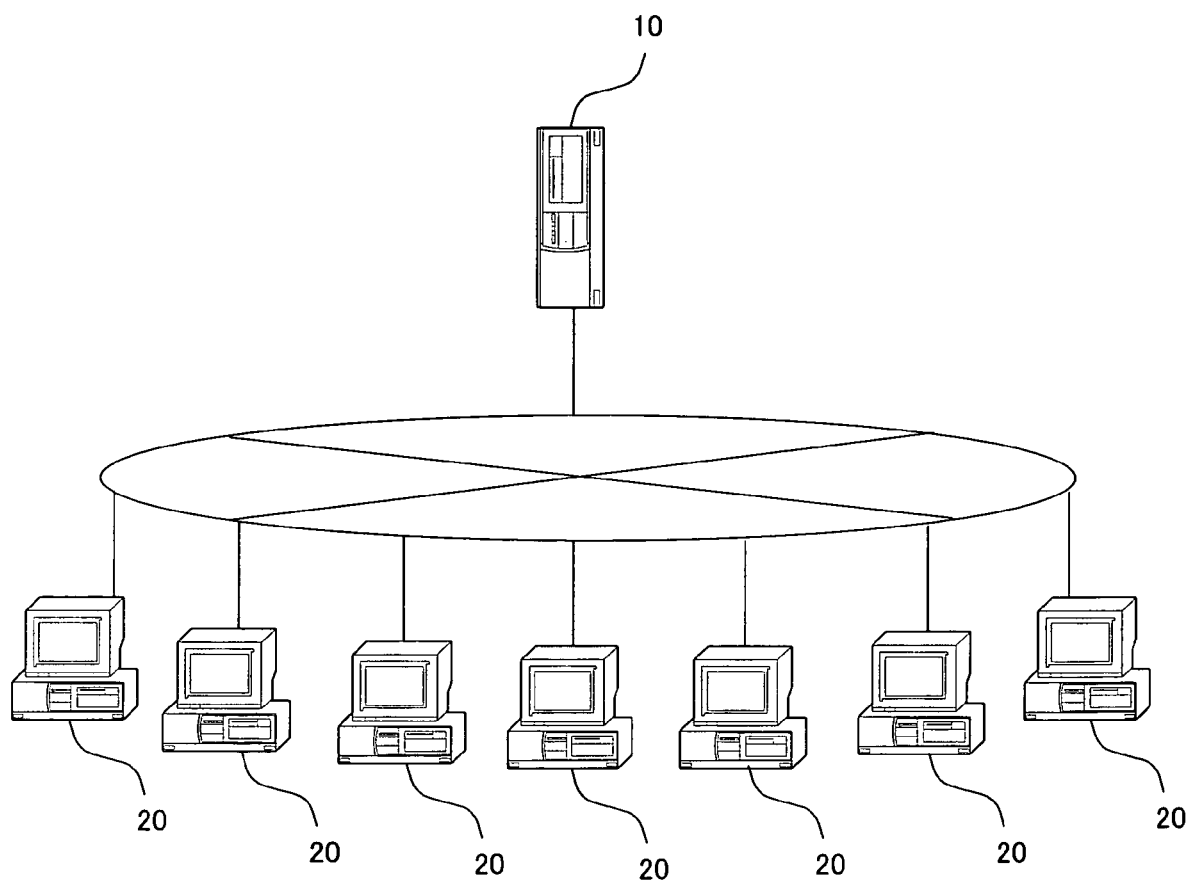

USER TERMINAL INFORMATION

| TERMINAL ID | IP ADDRESS | HOST FLAG | USER ID | PROFICIENCY LEVEL |
|---|---|---|---|---|
| AAA | ###.###.###.### | ○ | 111 | 5 |
| BBB | ###.###.###.### | — | 222 | 3 |
| CCC | ###.###.###.### | — | 333 | 1 |
| DDD | ###.###.###.### | — | 444 | 5 |
| EEE | ###.###.###.### | — | 555 | 5 |
| FFF | ###.###.###.### | — | 666 | 1 |
| GGG | ###.###.###.### | ○ | 777 | 2 |
| HHH | ###.###.###.### | — | 888 | 4 |
| JJJ | ###.###.###.### | ○ | 999 | 3 |
| ⋮ | ⋮ | ⋮ | ⋮ | ⋮ |

F I G. 3 5
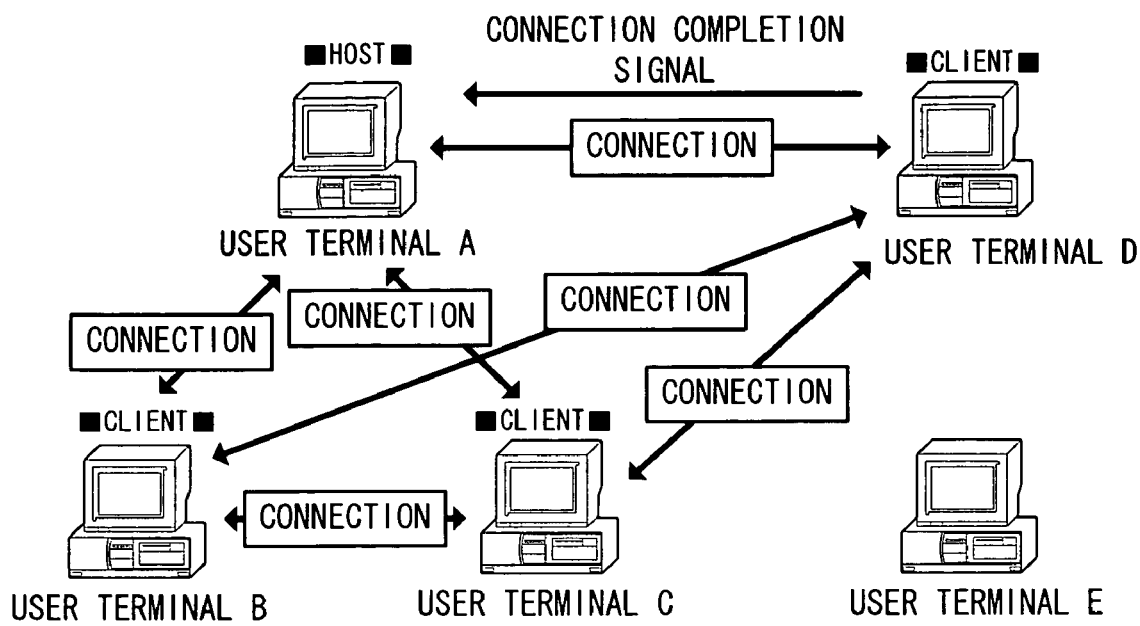
F I G. 3 6
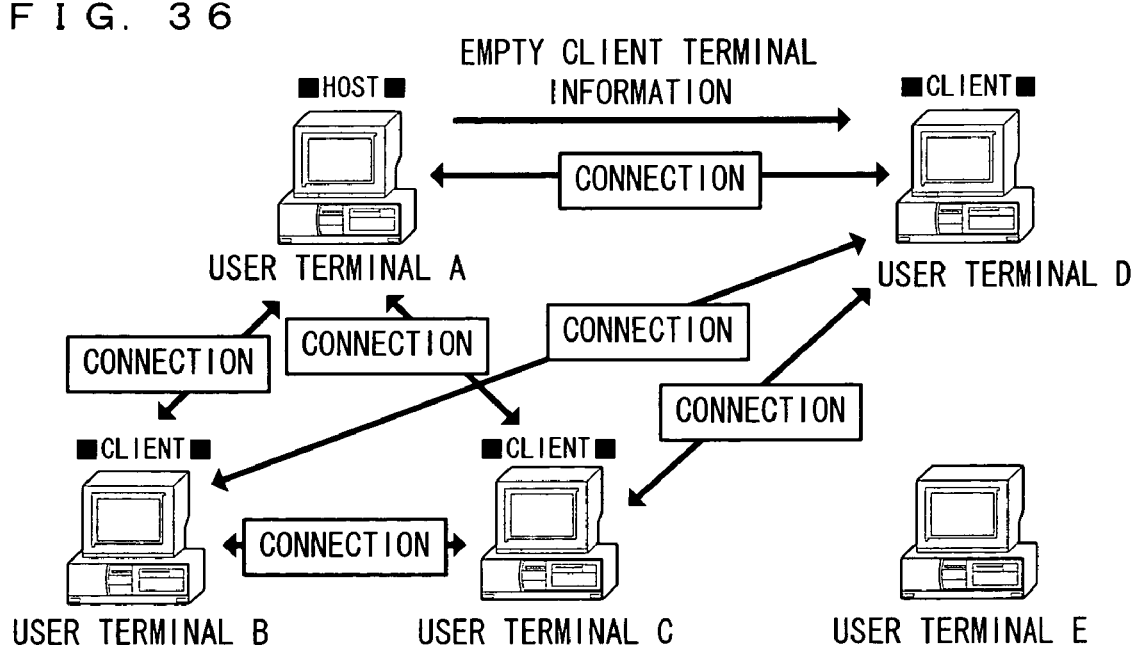

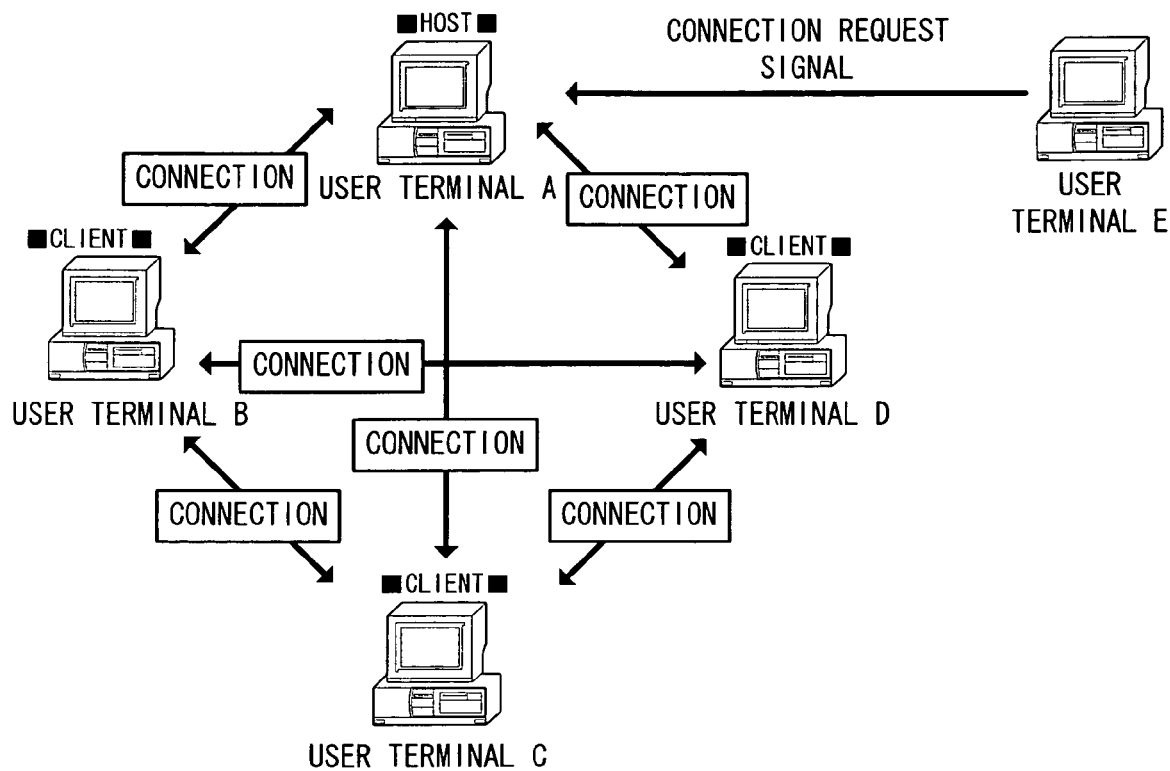
F I G. 3 7

NETWORK GAME SYSTEM AND NETWORK GAME PROGRAM

CROSS REFERENCE TO RELATED APPLICATION

The disclosure of Japanese Patent Application No. 2005-328148 is incorporated herein by reference.

TECHNICAL FIELD

The exemplary embodiments described herein relate to a network game system and a network game program, and particularly to a network game system and a network game program for a game which is executed via a communications network.

BACKGROUND AND SUMMARY

Network game systems can be roughly categorized into two types, i.e., client/server type network game systems and peer-to-peer network game systems.

In a client/server type network game system, each user terminal is connected to a game server as a client, and the game server mainly performs game processing to execute a game. In the client/server type network game system, the greater the number of user terminals connected to the game server is, the greater is the processing load on the game server. For this reason, the game server is required to have high capacity. This leads to a high cost of constructing the network game system, which is a disadvantage of the client/server type.

On the other hand, in a peer-to-peer network game system, basically, a game is executed through communications performed among user terminals. For this reason, a game server having high capacity, which is necessary for the client/server type network game system, is not necessary. In addition, data transfer among the user terminals is not required to be performed via a game server. Therefore, the peer-to-peer network game system is suitable for executing a game requiring real-time processing such as a racing game.

The peer-to-peer network game systems are further categorized into two types, i.e., host network systems (refer to FIG. 38) and mesh network systems (refer to FIG. 39). These two types of network share a common feature in which any one of user terminals comprising a network operates as a host terminal, and remaining user terminals operate as client terminals. In a host network system, the host terminal has very strong authority. The host terminal performs most of critical arithmetic processing just like a server of the client/server type network game system, and each client terminal performs only simple arithmetic processing. On the other hand, in the mesh network system, a host terminal plays limited roles compared with a host terminal of the host network system, and arithmetic processing is basically performed by each client terminal.

An exemplary peer-to-peer network game system is disclosed in a non-patent document 1 (Jung Wun-Chul, "Online Game Programming", SOFTBANK Publishing Inc., Mar. 3, 2005, first edition, pp. 218-222)

A conventional peer-to-peer network game system is established as follows: first, any of user terminals, which operates as a host terminal, creates a game session; and the other user terminals are sequentially connected to the host terminal. For instance, in the case where four users play a racing game together, one user terminal, which operates as a host terminal, creates a game session for the racing game, and then three user terminals are connected to the host terminal as client terminals. Then, the racing game starts. However, if each of a plurality of user terminals creates a game session while operating as a host terminal, and two user terminals are connected as client terminals to each host terminal, the racing game does not start even though there are more than three players in total who wish to play the racing game, because the number of client terminals connected to each host terminal has not reached a predetermined number.

Therefore, a feature of the present invention is to provide a network game system which is capable of: eliminating the above-described problem of the conventional peer-to-peer network game system; and efficiently establishing a network thereby preventing users from waiting for a long time for the network to be established.

The present invention has the following features. Note that reference numerals and the like indicated between parentheses are merely provided to facilitate the understanding of the present invention in relation to the drawings, rather than limiting the scope of the present invention in any way.

A first aspect is a network game system comprising a plurality of game devices (20) connected to each other via a network, each of which is capable of, in a game device group formed by one host terminal and at least one client terminal, operating as the host terminal or the client terminal. Each of the game devices, which constitutes the network game system, includes fundamental connection request transmission means (21, S20), fundamental connection request reception means (21, S22), acceptance determination means (21, S48), first host process means (21, S64), permission notification means (21, S52), client process means (21, S88), host connection request transmission means (21, S20), host connection request reception means (21, S22), host acceptance determination means (21, S48), second host process means (21, S64), host permission notification means (21, S52) and dispersion process means (21, S86). The fundamental connection request transmission means is for, when said each of the game devices does not belong to any game device group, transmitting a fundamental connection request to another game device (FIGS. 9 and 14). The fundamental connection request reception means is for receiving the fundamental connection request from still another game device. The acceptance determination means is for determining whether or not to accept the fundamental connection request received by the fundamental connection request reception means. The first host process means is for, when said each of the game devices does not belong to any game device group and a determination result provided by the acceptance determination means is positive, transmitting an acceptance notification to said still another game device which is a source of the fundamental connection request received by the fundamental connection request reception means, and causing said each of the game devices to operate as a host terminal of a game device group including at least said each of the game devices and said still another game device which is the source of the fundamental connection request received by the fundamental connection request reception means. The permission notification means is for, when said each of the game devices is operating as a host terminal and a determination result provided by the acceptance determination means is positive, transmitting the acceptance notification to said still another game device which is the source of the fundamental connection request received by the fundamental connection request reception means. The client process means is for, when the acceptance notification is received from said another game device in response to the fundamental connection request transmitted by the fundamental connection request transmission means, causing said each of the game devices to operate as a client terminal subordinate to said another game device having accepted the fundamental connection request. The host connection request transmission means is for, when said each of the game devices is operating as a host terminal, transmitting a host connection request to any other game device (FIG. 23). The host connection request reception means is for receiving the host connection request from any host terminal. The host acceptance determination means is for determining whether or not to accept the host connection request received by the host connection request reception means. The second host process means is for, when said each of the game devices does not belong to any game device group and a determination result provided by the host acceptance determination means is positive, transmitting a host acceptance notification to said any host terminal which is a source of the host connection request received by the host connection request reception means, and causing said each of the game devices to operate as a host terminal of a game device group including at least said each of the game devices and a game device having previously operated as said any host terminal which is the source of the host connection request received by the host connection request reception means. The host permission notification means is for, when said each of the game devices is operating as a host terminal and a determination result provided by the host acceptance determination means is positive, transmitting the host acceptance notification to said any host terminal which is the source of the host connection request received by the host connection request reception means. The dispersion process means is for, when the host acceptance notification is received from said any other game device in response to the host connection request transmitted by the host connection request transmission means, transmitting a dispersion notification to a client terminal of a game device group to which said each of the game devices belongs, and causing said each of the game devices to operate as a client terminal subordinate to said any other game device having accepted the host connection request.

As a modification example of the first aspect, the host connection request transmission means of each of the game devices may transmit the host connection request to another host terminal only when a number of client terminals of a game device group, to which said each of the game devices belongs, has not reached a predetermined number.

As another modification example of the first aspect, the host connection request transmission means of each of the game devices may change, based on a number of client terminals of a game device group to which said each of the game devices belongs, an interval between each transmission of the host connection request to another game device.

As further another modification example of the first aspect, the host connection request transmission means of each of the game devices may lengthen an interval between each transmission of the host connection request to another host terminal, in accordance with an increase in a number of client terminals of a game device group, to which said each of the game devices belongs.

As further another modification example of the first aspect, the network game system may further comprise an address information server. The address information server may include: game device information collection means for collecting, from each of the game devices connected to the network, game device information containing address information for accessing at least said each of the game devices, and storing the game device information in a storage section; and address information transmission means for, in response to an address information acquisition request from one of the game devices connected to the network, transmitting, to said one of the game devices, address information about at least one game device which is different from said one of the game devices from among address information about the game devices which has been collected by the game device information collection means.

As further another modification example of the first aspect, the address information transmission means, in response to the address information acquisition request from one of the game devices connected to the network, may transmit, to said one of the game devices, an address information list containing the address information about the game devices except said one of the game devices. Each of the game devices may further include: address information list request means for requesting the address information list from the address information server; address information list reception means for receiving the address information list from the address information server; and address information extraction means for randomly extracting one piece of address information from the address information list received by the address information list reception means. The fundamental connection request transmission means of each of the game devices may transmit, by using the one piece of address information randomly extracted by the address information extraction means, the fundamental connection request to a game device corresponding to the one piece of address information.

As further another modification example of the first aspect, the address information transmission means, in response to the address information acquisition request from a host terminal connected to the network, may transmit, to the host terminal, the address information list containing address information about a plurality of other host terminals. Each of the game devices may further include: the address information list request means for requesting the address information list from the address information server; the address information list reception means for receiving the address information list from the address information server; and the address information extraction means for, based on a predetermined indicator contained in each piece of address information in the address information list received by the address information list reception means, extracting one piece of address information from the address information list. The host connection request transmission means of each of the game devices may transmit, by using the one piece of address information extracted by the address information extraction means, a host connection request to a host terminal corresponding to the one piece of address information.

As further another modification example of the first aspect, in the case where a plurality of pieces of address information are extracted, based on the predetermined indicator, from the address information list received by the address information list reception means, the address information extraction means may randomly extract one piece of address information from among the plurality of pieces of extracted address information.

As further another modification example of the first aspect, the address information transmission means, in response to the address information acquisition request from a host terminal connected to the network, may transmit, to the host terminal, the address information list containing address information about a plurality of other host terminals. Each of the game devices may further include: the address information list request means for requesting the address information list from the address information server; the address information list reception means for receiving the address information list from the address information server; and the address information extraction means for randomly extracting one piece of address information from the address information list received by the address information list reception means. The host connection request transmission means of each of the game devices may transmit, by using the one piece of address information randomly extracted by the address information extraction means, a host connection request to a host terminal corresponding to the one piece of address information.

As further another modification example of the first aspect, when, after the fundamental connection request transmission means has transmitted a fundamental connection request to a first other game device and before an acceptance or a rejection of the fundamental connection request is notified, the fundamental connection request reception means receives a fundamental connection request from a second other game device, the acceptance determination means may determine based on a predetermined criterion whether or not to accept the fundamental connection request from the second other game device. Each of the game devices may further include cancellation signal transmission means for, when a determination result provided by the acceptance determination means is positive, transmitting a cancellation signal to the first other game device.

As further another modification example of the first aspect, the acceptance determination means may determine, by comparing an identifier associated with the first other game device with an identifier associated with the second other game device, whether or not to accept the fundamental connection request from the second other game device.

A second aspect of the present invention is a computer-readable storage medium storing a network game program used in a network game system in which a plurality of game devices (20) connected to each other via a network form a game device group, and one game device in the game device group operates as a host terminal whereas remaining game devices operate as client terminals. The network game program causes a computer (21) of each of the plurality of game devices to function as fundamental connection request transmission means, fundamental connection request reception means, acceptance determination means, first host process means, permission notification means, client process means, host connection request transmission means, host connection request reception means, host acceptance determination means, second host process means, host permission notification means and dispersion process means.

A third aspect of the present invention is a network game system for forming one game device group from at least two game device groups each being formed by a plurality of game devices connected to each other via a network. In the system, a first game device (20), which operates as a host terminal of a first game device group, includes connection request transmission means (21, S20) and dispersion process means (21, S84, S86). The connection request transmission means is for transmitting a connection request to a second game device, which operates as a host terminal of a second game device group. The dispersion process means is for, when the first game device has received a connection permission notification from the second game device, dispersing the first game device group after transmitting, to a game device operating as a client terminal in the first game device group, connection destination information for establishing a connection with the second game device. The second game device (20), which operates as the host terminal of the second game device group, includes connection permission notification transmission means (21, S52) and client acceptance means (21, S64). The connection permission notification transmission means is for transmitting the connection permission notification to the first game device when the second game device is able to accept the connection request from the first game device. The client acceptance means is for, after the connection permission notification means has transmitted the connection permission notification, accepting the first game device as a client terminal of the second game device group.

As a modification example of the third aspect of the present invention, the second game device may have second acceptance means for, when the second game device receives the connection request from the game device operating as the client terminal in the first game device group, accepting the game device as a client terminal of the second game device group, provided that the game device satisfies a predetermined condition.

As another modification example of the third aspect, communications among the game devices of the at least two game device groups may be performed via a matching server (10) which manages a connection destination for each of the game devices and information about each of the game device groups.

As further another modification example of the third aspect, the first game device may further include: acceptance determination means for, when, after the connection request transmission means has transmitted to the second game device a connection request and before an acceptance or a rejection of the connection request is notified, the first game device receives a connection request from a third game device, determining based on a predetermined criterion whether or not to accept the connection request from the third game device; and cancellation signal transmission means for transmitting a cancellation signal to the second game device when a determination result provided by the acceptance determination means is positive.

As further another modification example of the third aspect, the acceptance determination means may determine whether or not to accept the connection request from the third game device by comparing an identifier associated with the second game device with an identifier associated with the third game device.

A fourth aspect of the present invention is a computer-readable storage medium storing a network game program used in a network game system in which one game device group is formed from at least two game device groups each comprising a plurality of game devices (20) which are connected to each other via a network. The network game program causes a computer (21) of a first game device, which operates as a host terminal of a first game device group, to function as connection request transmission means and dispersion process means, and causes a computer (21) of a second game device, which operates as a host terminal of a second game device group, to function as connection permission notification transmission means and client acceptance means.

A fifth aspect of the present invention is a game device in a network game system comprising a plurality of game devices (20) which are connected to each other such that the game devices are able to communicate with each other. The game device includes request acceptance process means (21, S20), client process means (21, S88) and host process means (21, S64). The request acceptance process means is for simultaneously performing a connection request process for transmitting a connection request to another game device in order to participate in a game device group, and a connection acceptance process for accepting a connection request from another game device in order to form a game device group. The client process means is for, when the game device is allowed to participate in the game device group as a result of performing the connection request process, performing a process in order for the game device to operate as a client terminal of the game device group. The host process means is for, when a game device group is allowed to be formed as a result of performing the connection acceptance process, performing a process in order for the game device to operate as a host terminal of the game device group.

As a modification example of the fifth aspect, the game device may further include dispersion means for, when, in the case where the game device is operating as a host terminal of a game device group by means of the host process means, the game device is allowed to participate in another game device group by means of the request acceptance process means, transmitting, to a game device operating as a client terminal of the game device group to which the game device operating as the host terminal belongs, connection destination information about another game device operating as a host terminal of said another game device group, and then dispersing the game device group.

As another modification example of the fifth aspect, the game device may further include: new connection destination information reception means for, when the game device is operating as a client terminal by means of the client process means, receiving, from a host terminal of a game device group to which the game device belongs, connection destination information about a host terminal of another game device group; and connection request means for, when the host terminal of the game device group, to which the game device belongs, has dispersed the game device group, transmitting a connection request to the host terminal of said another game device group in accordance with the connection destination information about the host terminal of said another game device group.

As further another modification example of the fifth aspect, the game device may further include: acceptance determination means for, when, after the request acceptance process means has transmitted a connection request to a first other game device and before an acceptance or a rejection of the connection request is notified, the game device receives a connection request from a second other game device, determining based on a predetermined criterion whether or not to accept the connection request from the second other game device; and cancellation signal transmission means for transmitting a cancellation signal to the first other game device when a determination provided by the acceptance determination means is positive.

As further another modification example of the fifth aspect, the acceptance determination means may determine, by comparing an identifier associated with the first other game device with an identifier associated with the second other game device, whether or not to accept the connection request from the second other game device.

A sixth aspect of the present invention is a computer readable storage medium storing a network game program for causing a computer (21) of a game device, which is in a network game system comprising a plurality of game devices (20) which are connected to each other such that the devices are able to communicate with each other, to function as request acceptance process means, client process means and host process means.

According to the above-described present invention, a host terminal transmits a host-to-host connection request to another host terminal. This eliminates a problem that a game does not start even if there are more than a predetermined number of users who wish to play the game, because the number of client terminals connected to each host terminal has not reached a predetermined number. Thus, a game device group is efficiently formed, and users are allowed to start playing a network game without being kept waiting for a long time.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a configuration of a network game system as an exemplary embodiment of the present invention.

FIG. 35 is further another diagram showing the process of establishing a peer-to-peer network;

FIG. 36 is further another diagram showing the process of establishing a peer-to-peer network;

FIG. 37 is further another diagram showing the process of establishing a peer-to-peer network;

DETAILED DESCRIPTION

Hereinafter, an exemplary embodiment of the present invention is described with reference to the drawings.

FIG. 1 shows a configuration of a network game system as the exemplary embodiment of the present invention. The network game system comprises an address information server 10 and a plurality of user terminals (game devices) 20.

Figure 2:
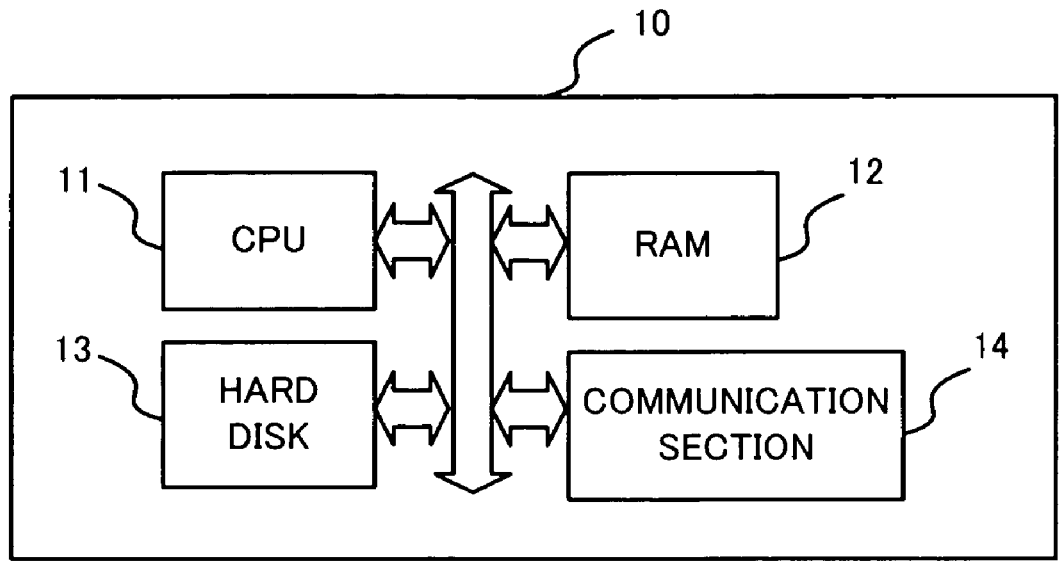
FIG. 2 is an exemplary configuration of an address information server 10.

FIG. 2 shows an exemplary configuration of the address information server 10. The address information server 10 includes a CPU 11, RAM 12, hard disk 13 and a transmission section 14. The CPU 11 loads a computer program stored in the hard disk 13 into the RAM 12, and executes the program. Main functions of the address information server 10, which are implemented by the computer program, are: regularly receiving later-described user terminal information (FIG. 4) from each of the user terminals 20; storing the information into the RAM 12; and, in response to a request from a user terminal 20, transmitting an address information list to the user terminal 20 in accordance with the user terminal information.

Figure 3:
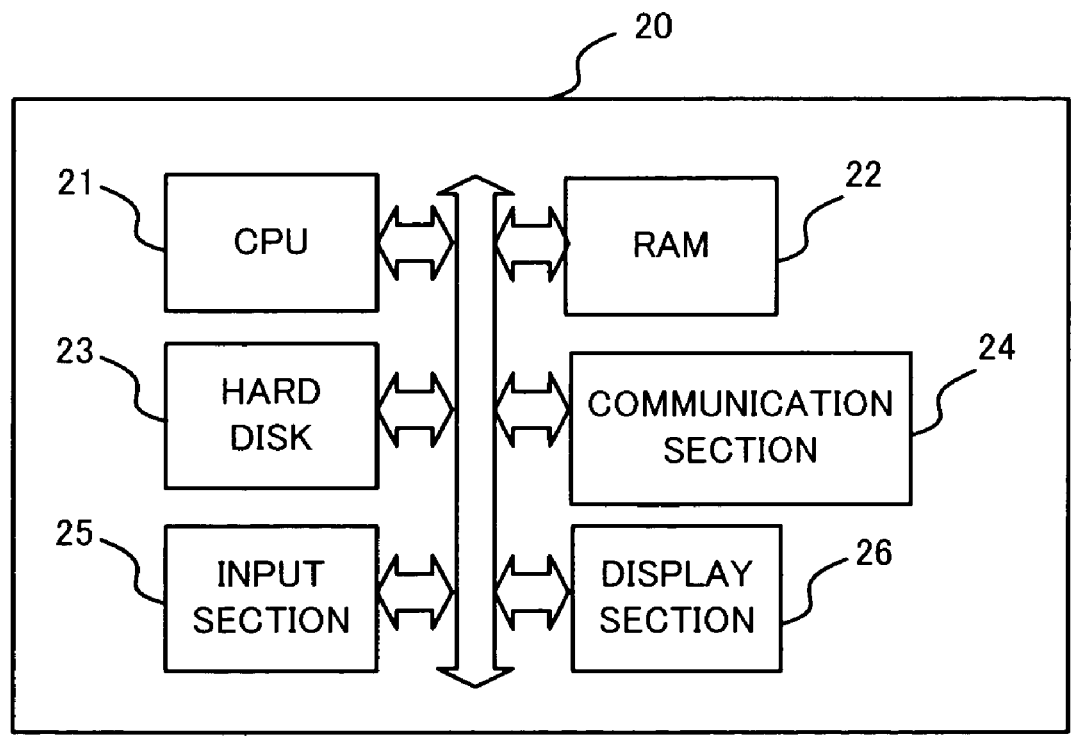
FIG. 3 is an exemplary configuration of a user terminal 20.

FIG. 3 shows an exemplary configuration of the user terminal 20. The user terminal 20 includes a CPU 21, RAM 22, hard disk 23, transmission section 24, input section 25 and a display section 26. The CPU 21 loads a network game program prestored in the hard disk 23 into the RAM 22, and executes the program. Although an example in which the network game program is prestored in the hard disk 23 is described here, the present invention is not limited thereto. The network game program may be supplied to the user terminal 20 through an external storage medium such as a memory card, a cartridge or a DVD-ROM. Also, the network game program may be supplied to the user terminal 20 through the transmission section 24. Main functions of the user terminals 20, which are implemented by the network game program, are: establishing a peer-to-peer network which allows a plurality of players to play a game together; and executing a video game such as a racing game in which the user terminals belonging to the peer-to-peer network transmit and receive game data to and from each other. The input section 25 is used for game operations. The display section 26 is used to display game images.

Figures 4, 5:
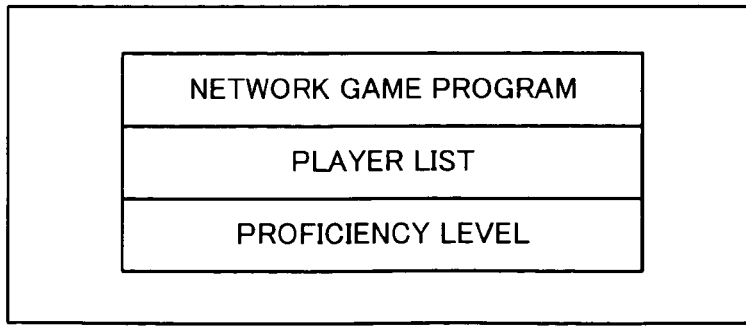
FIG. 4 is exemplary user terminal information stored in a RAM 12 of the address information server 10.
FIG. 5 is an exemplary memory map of a RAM 22 of the user terminal 20.

FIG. 4 shows exemplary user terminal information stored in the RAM 12 of the address information server 10. The user terminal information is updated based on information transmitted from each user terminal 20. The user terminal information contains, for each user terminal, a terminal ID, IP address, host flag, user ID and a proficiency level. The terminal ID is information for specifying a user terminal 20. The IP address is address information for accessing the user terminal 20 by using a TCP/IP protocol, and contains port number information. The host flag indicates whether or not the user terminal 20 is operating as a host terminal. The user ID is information for specifying a user playing a game by using the user terminal 20. The proficiency level indicates the user's proficiency level for the game. If, in a game such as a racing game, the user finishes a race in a high position, a value indicating the proficiency level of the user is incremented. Such an increment of the value becomes greater if the user finishes the race in a high position when the user plays the racing game with other users having high proficiency levels.

FIG. 5 shows an exemplary memory map of the RAM 22 of the user terminal 20. The RAM 22 stores, e.g., the network game program loaded from the hard disk 23, a player list, and information about the proficiency level of a user of the user terminal 20. These are updated as necessary. The player list is collective player information about users with whom the user intends to play a game (i.e., users participating in a game session with the user). Each pieces of player information contains, for one user, the user ID, proficiency level and the like.

Hereinafter, a sequence of processes, which are performed by the CPU 21 of the user terminal 20 (for convenience, referred to as a user terminal X) in accordance with the network game program, will be described with reference to flowcharts of FIGS. 6 to 8.

Figure 6:
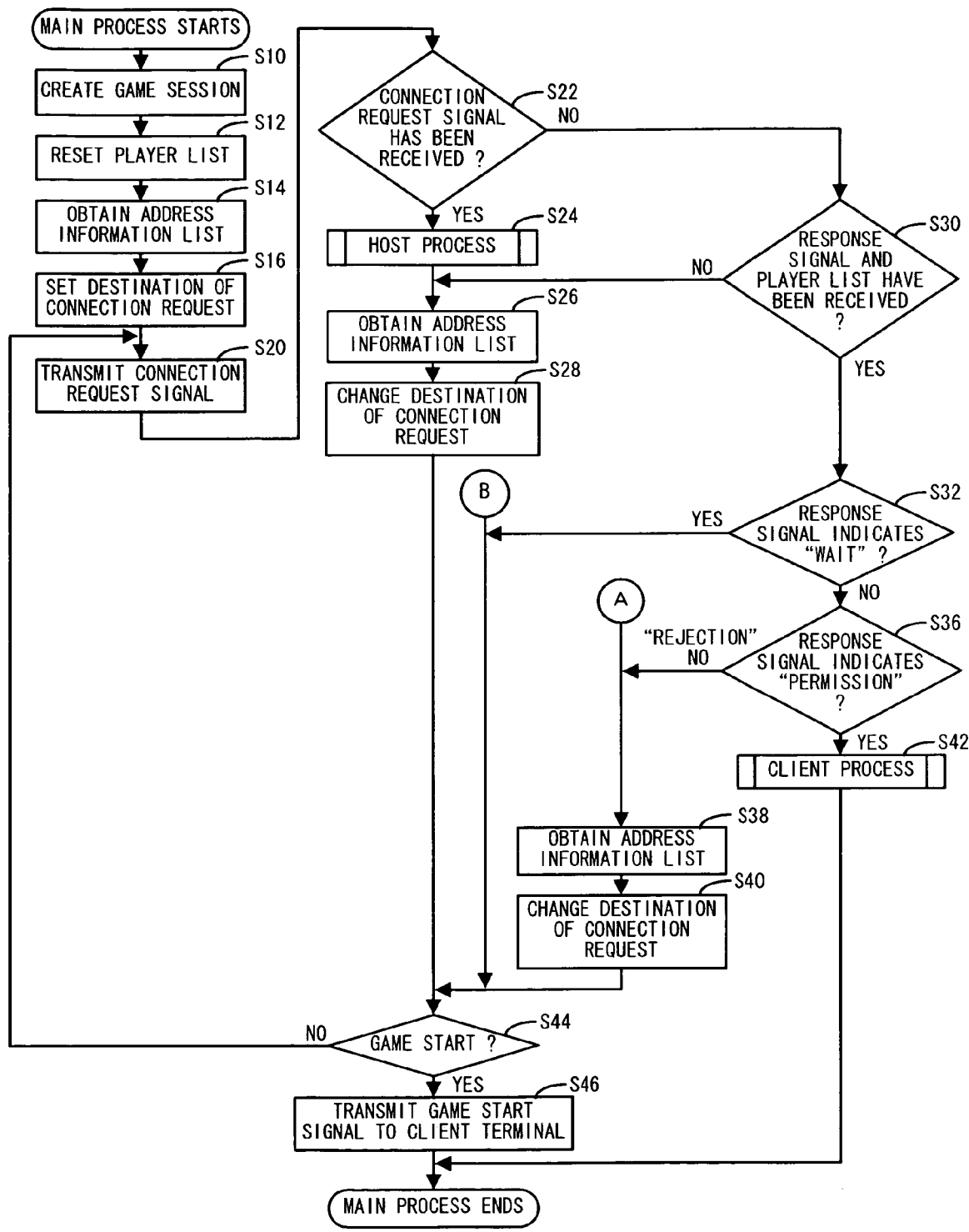
FIG. 6 is a flowchart showing a sequence of processes performed by a CPU 21 of the user terminal 20.

FIG. 6 is a flowchart showing a sequence of a main process. When the main process starts to be performed, the CPU 21 first creates a game session at step S10.

At step S12, the player list stored in the RAM 22 is reset.

At step S14, the CPU 21 requests, via the transmission section 24, the address information list from the address information server 10. To be specific, when the CPU 21 requests the address information list from the address information server 10, the CPU 21 transmits, to the address information server 10, information about the proficiency level stored in the RAM 22 (here, the proficiency level is assumed as "2"). In response, the CPU 11 of the address information server 10 extracts, from among user terminal information shown in FIG. 4, at least one piece of user terminal information in which the host flag is set to "on", and the proficiency level has a value close to "2" (e.g., 1, 2 or 3). Then, the CPU 11 transmits, to the user terminal X, a list of the extracted user terminal information as the address information list.

At step S16, the CPU 21 extracts one piece of user terminal information from the address information list obtained from the address information server 10. Then, the CPU 21 sets (stores in the RAM 22), as a destination of a connection request, a user terminal corresponding to the extracted user terminal information (for convenience, hereinafter referred to as a user terminal Y). A conceivable manner of extracting one piece of user terminal information from the address information list is, for example, extracting one piece of information in accordance with any indicator (e.g., a proficiency level, a device ID or a player ID), or randomly extracting one piece of information. For instance, in the case where the address information list contains a plurality of pieces of user terminal information respectively containing different proficiency levels, one piece of user terminal information, which contains a proficiency level being closest to a proficiency level stored in the RAM 22, may be extracted from among the plurality of pieces of user terminal information. In the case where the address information list contains a plurality of pieces of user terminal information each containing a proficiency level which is closest to the proficiency level stored in the RAM 22, one piece of user terminal information may be randomly extracted from among the plurality of pieces of user terminal information.

At step S20, by using an IP address contained in the user terminal information extracted at step S16, the CPU 21 transmits a connection request signal to the destination of the connection request (the user terminal Y) set at step S16. Note that, although a transmission of the connection request signal to another user terminal is performed at step S20, a reception of the connection request signal from another user terminal may be performed at any time.

It is determined at step S22 whether the connection request signal has been received from another user terminal (for convenience, hereinafter referred to as a user terminal Z). When the connection request signal has been received, the process proceeds to step S24. When the connection request signal has not been received, the process proceeds to step S30.

At step S24, a host process is performed. The host process is a series of processes which are performed when the connection request signal has been received from another user terminal (here, from the user terminal Z). Hereinafter, the host process is described in detail with reference to the flowchart of FIG. 7.

Figure 7:
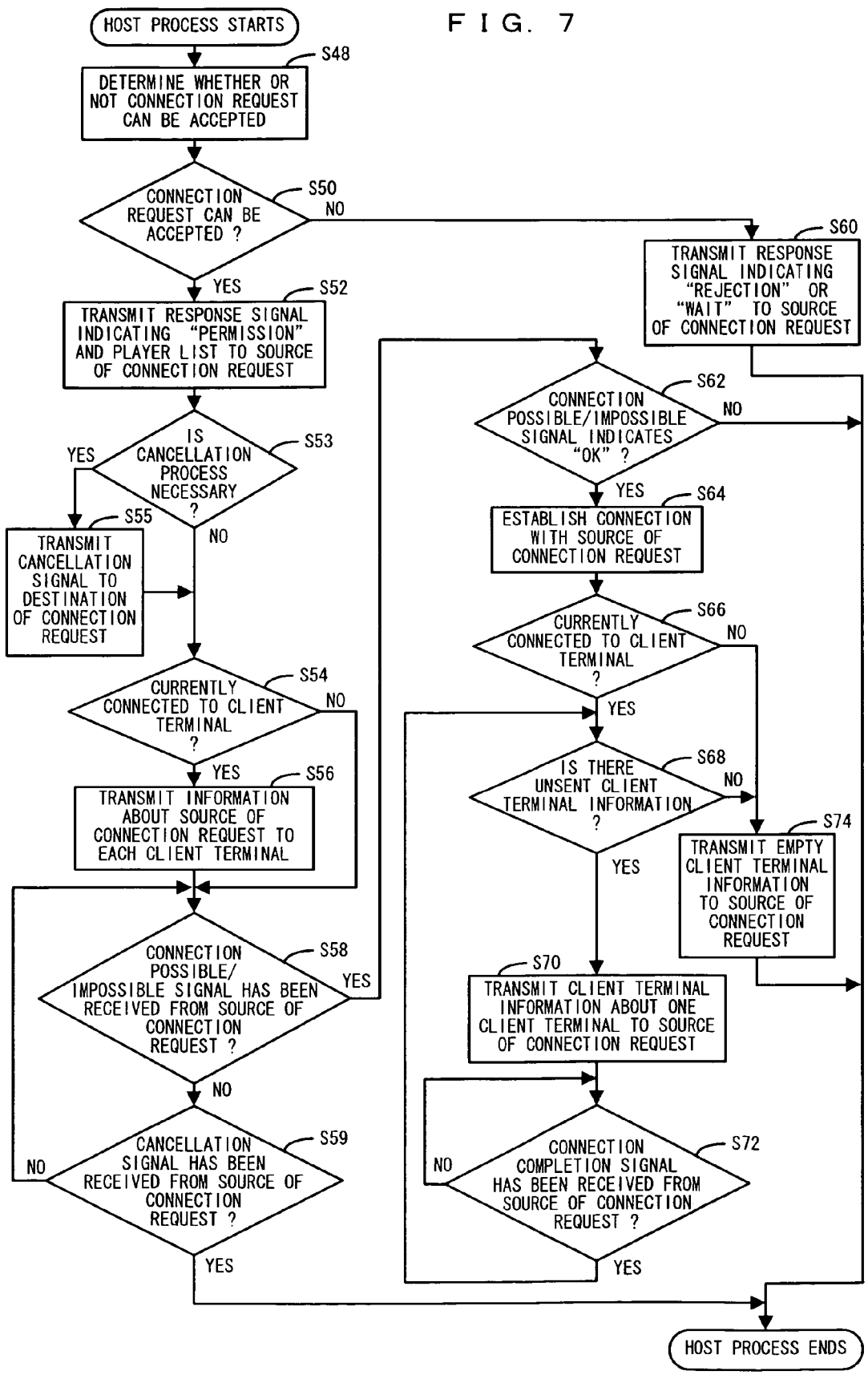
FIG. 7 is a flowchart showing a sequence of a host process.

At step S48 of FIG. 7, the CPU 21 determines whether the connection request from the user terminal Z is acceptable. In other words, the CPU 21 determines whether the user terminal Z can be accepted as a new client terminal to be connected to the user terminal X. At this point, the CPU 21 may have not received, from the destination of the connection request (the user terminal Y), a response signal for the connection request signal transmitted at step S20 of FIG. 6. In such a case, the CPU 21 determines, in accordance with predetermined criteria, whether the connection request from the user terminal Z can be accepted. For example, a determination may be made based on which of values respectively indicated by the terminal IDs of the user terminals Y and Z is greater. Alternatively, a determination may be made based on which of values respectively indicated by the user IDs of the users using the user terminals Y and Z is greater. Note that, when the CPU 21 has not received the response signal from the user terminal Y as described above, the connection request from the user terminal Z may be always rejected, or always accepted.

When a determination result at step S48 indicates that the connection request from the user terminal Z is acceptable, the CPU 21 determines "Yes" at step S50, and then the process proceeds to step S52. When the determination result at step S48 indicates that the connection request from the user terminal Z is not acceptable, the CPU 21 determines "No" at step S50, and then the process proceeds to step S60.

At step S52, the CPU 21 transmits a response signal indicating "permission" and the player list stored in the RAM 22 to a source of the connection request (i.e., the user terminal Z).

It is determined at step S53 whether a cancellation process is required to be performed. If the cancellation process is required to be performed, the host process proceeds to step S55. If the cancellation process is not required to be performed, the host process proceeds to step S54. Here, the cancellation process is a process which is performed when it is determined at step S48 that the connection request from the user terminal Z is acceptable even though the CPU 21 has not received, from the destination of the connection request (the user terminal Y), the response signal for the connection request signal transmitted at step S20 of FIG. 6. In the cancellation process, the CPU 21 transmits, to the user terminal Y which is the destination of the connection request, a cancellation signal for notifying the user terminal Y about a cancellation of the connection request.

At step S55, the cancellation signal is transmitted to the destination of the connection request.

It is determined at step S54 whether there exists a client terminal connected to the user terminal X. If there exists such a client terminal, the process proceeds to step S56. If there does not exist such a client terminal, the process proceeds to step S58.

At step S56, the CPU 21 transmits information about the user terminal Z (such as an IP address) to the client terminal connected to the user terminal X, or to each of a plurality of client terminals connected to the user terminal X.

It is determined at step S58 whether a connection possible/impossible signal has been received from the user terminal Z. When the connection possible/impossible signal has been received, the process proceeds to step S62. When the connection possible/impossible signal has not been received, the process proceeds to step S59.

It is determined at step S59 weather the cancellation signal has been received from the source of the connection request. When the cancellation signal has been received, the host process ends, and then the CPU 21 performs step S26 of FIG. 6. When the cancellation signal has not been received, the host process returns to step S58.

It is determined at step S62 whether the connection possible/impossible signal received from the user terminal Z indicates "OK". When the signal indicates "OK", the host process proceeds to step S64. When the signal indicates "No", the host process ends.

At step S64, the user terminal X is connected to the user terminal Z. This allows the user terminal Z to newly participate as a client terminal in the game session created by the user terminal X.

It is determined at step S66 whether the user terminal X is currently connected to any client terminal (other than the user terminal Z having newly become a client terminal). When the user terminal X is currently connected to any client terminal, the process proceeds to step S68. When the user terminal X is not currently connected to any client terminal, the process proceeds to step S74.

It is determined at step S68 whether there exists information about a client terminal (such as an IP address) which has not been transmitted to the user terminal Z (i.e., client terminal information about the client terminal currently connected to the user terminal X). When there exists such client terminal information which has not been transmitted to the user terminal Z, the process proceeds to step S70. When such client terminal information, which has not been transmitted to the user terminal Z, no longer exists, the process proceeds to step S74.

At step S70, one piece of client terminal information among pieces of client terminal information which have not been transmitted is transmitted to the user terminal Z.

It is determined at step S72 whether a connection completion signal has been received from the user terminal Z. When the connection completion signal has been received, the process returns to step S68. When the connection completion signal has not been received, the CPU 21 waits for the connection completion signal to be received.

At step S74, "empty client terminal information" is transmitted to the user terminal Z. The empty client terminal information is transmitted for notifying the user terminal Z that the client terminal information of all client terminals has been transmitted.

Note that, when a determination result at step S50 is negative, a response signal indicating "rejection" or "wait" is transmitted to the user terminal Z at step 60, and then the host process ends. The response signal indicating "rejection" is transmitted when the connection request from the user terminal Z is rejected. Typically, the response signal indicating "rejection" is transmitted when the number of client terminals which are connected to the user terminal X exceeds a predetermined maximum number (e.g., "5") of client terminals which can be connected to the user terminal X. The response signal indicating "wait" is transmitted when the user terminal X temporarily delays a response to the connection request received from the user terminal Z. Typically, the response signal indicating "wait" is transmitted when the user terminal X receives the connection request from the user terminal Z before the user terminal X receives a response to a connection request which the user terminal X has transmitted to another user terminal (e.g., the user terminal Y).

Refer to FIG. 6 again. When the host process at step S24 ends, the CPU 21 performs step S26.

Similarly to step S14, at step S26, the user terminal X obtains the address information list from the address information server 10.

Similarly to step S16, at step S28, one piece of user terminal information is extracted from the address information list obtained from the address information server 10. Then, the destination of the connection request is changed such that a user terminal corresponding to the extracted user terminal information becomes a next destination of the connection request.

It is determined at step S44 whether to start a game. When the game is started, the process proceeds to step S46. When the game is not started, the process returns to step S20.

At step S46, a game start signal is transmitted to the client terminal connected to the user terminal X, and the game starts.

It is determined at step S30 whether the response signal (containing the player list) has been received from the user terminal Y in response to the connection request signal transmitted from the user terminal X. When the response signal has been received, the process proceeds to step S32. When the response signal has not been received, the process proceeds to step S26.

When a determination result at step S22 is positive, or when a determination result at step S30 is negative, steps S26, S28 and S20 are repeatedly performed, and the connection request signal is repeatedly transmitted until the game starts. An interval between each transmission of the connection request signal changes based on the number of client terminals connected to the user terminal X. Typically, the greater the number of client terminals connected to the user terminal X, the longer is the interval between each transmission of the connection request signal. For example, in the case where the number of client terminals connected to the user terminal X is N, the number of seconds of the interval between each transmission of the connection request signal may be set as 3+3×N. Note that, steps S26 and S28 may be performed immediately before the transmission of the connection request signal so that the connection request signal is transmitted based on latest user terminal information.

It is determined at step S32 whether the response signal from the user terminal Y indicates "wait". When the response signal indicates "wait", the process proceeds to step S44. When it is determined at step S44 that the game does not start, the connection request signal is transmitted again to the user terminal Y at step S20 after, for example, 3+3×N seconds have passed (here, N is the number of client terminals connected to the user terminal X). When the response signal from the user terminal Y does not indicate "wait", the process proceeds to step S36.

It is determined at step S36 whether the response signal from the user terminal Y indicates "permission". When the response signal indicates "permission", the process proceeds to step S42. When the response signal does not indicate "permission" (i.e., when the response signal indicates "rejection"), the process proceeds to step S38.

Similarly to step S14, at step S38, the user terminal X obtains the address information list from the address information server 10.

Similarly to step S16, at step S40, one piece of user terminal information is extracted from the address information list obtained from the address information server 10. Then, the destination of the connection request is changed such that a user terminal corresponding to the extracted user terminal information becomes a next destination of the connection request.

Note that, when a determination result at step S36 is negative (i.e., when the response signal from the user terminal Y indicates "rejection"), the CPU 21 may immediately perform steps S38, S40, S44 and S20 without waiting for a predetermined period of time, thereby transmitting the connection request signal to the next destination of the connection request.

At step S42, the CPU 21 performs a client process. The client process is a series of processes which are performed when the connection request signal transmitted by the user terminal X is accepted by another user terminal (here, the user terminal Y). Hereinafter, the client process is described in detail with reference to the flowchart of FIG. 8.

Figure 8:
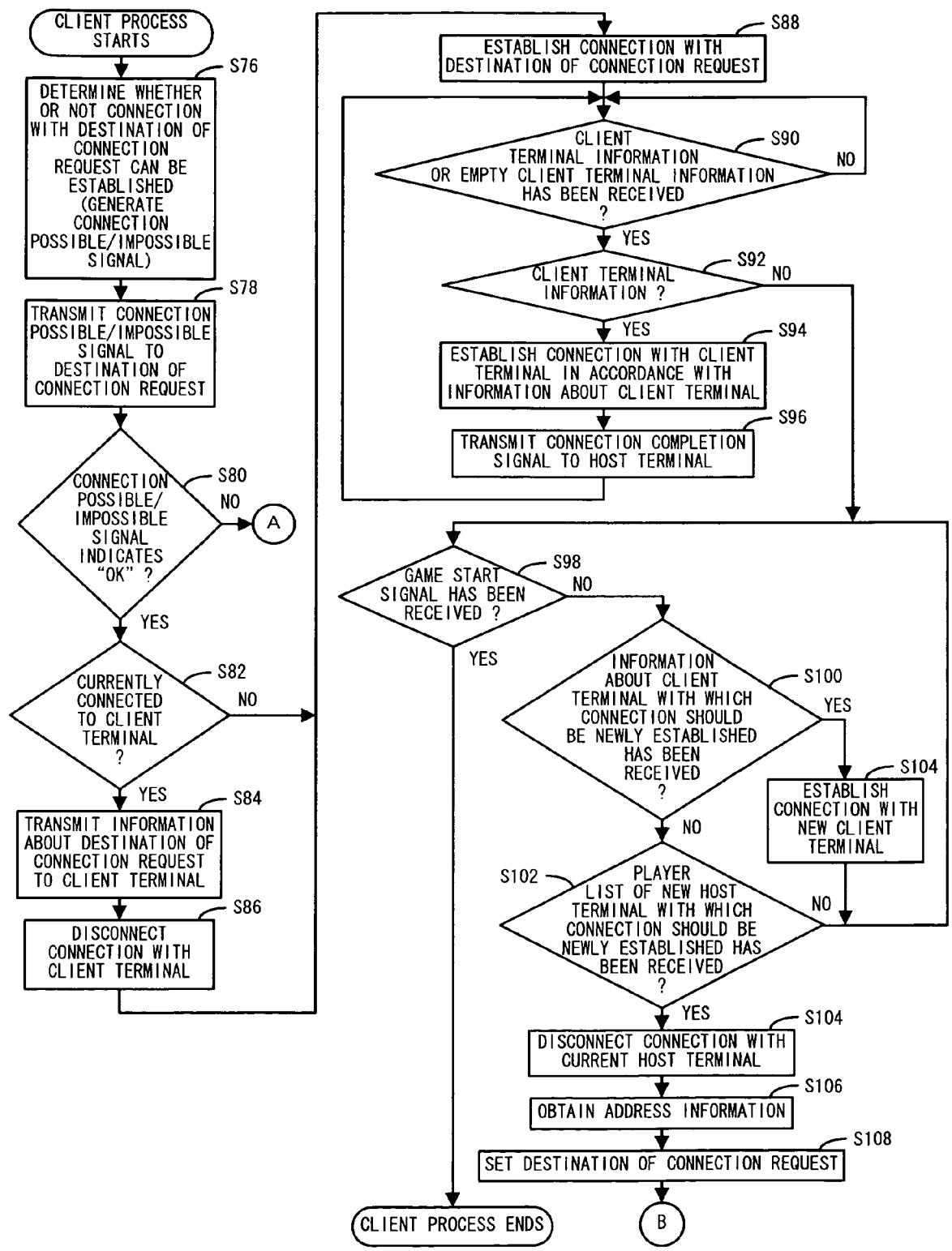
FIG. 8 is a flowchart showing a sequence of a client process.

At step S76 of FIG. 8, the CPU 21 determines whether a connection to the destination of the connection request (the user terminal Y) can be established, and generates the connection possible/impossible signal (indicating "OK" or "NO"). The CPU 21 determines that the connection cannot be established when, for example, another client terminal is newly connected to the user terminal X while the CPU 21 is waiting for the response signal from the user terminal Y, and thereby conditions for starting the game are satisfied.

At step S78, the connection possible/impossible signal generated at step S76 is transmitted to the user terminal Y.

It is determined at step S80 whether the connection possible/impossible signal transmitted at step S78 indicates "OK". When the signal indicates "OK", the client process proceeds to step S82. When the signal does not indicate "OK" (i.e., when the signal indicates "NO"), the client process ends, and then the CPU 21 performs step S38 of FIG. 6.

It is determined at step S82 whether there exists a client terminal currently connected to the user terminal X. When there exists such a client terminal, the process proceeds to step S84. When there does not exist such a client terminal, the process proceeds to step S88.

At step S84, information about the user terminal Y (such as an IP address) is transmitted to the client terminal currently connected to the user terminal X.

At step S86, a connection between the user terminal X and the client terminal is disconnected, and thereby the game session created by the user terminal X ceases to exist.

At step S88, the user terminal X is connected to the user terminal Y. This enables the user terminal X, which has been operated as the host terminal until immediately before the connection to the user terminal Y is established, to participate, as a client terminal, in the game session created by the user terminal Y.

The CPU 21 determines at step S90 whether the client terminal information (i.e., information such as an IP address of a client terminal connected to the user terminal Y) or the empty client terminal information has been received from the user terminal Y. When such information has been received, the process proceeds to step S92. When such information has not been received, the CPU 21 waits for the information to be received.

It is determined at step S92 whether the client terminal information (i.e., information about any client terminal connected to the user terminal Y) has been received from the user terminal Y. When the client terminal information has been received, the process proceeds to step S94. When the client terminal information has not been received (i.e., when the empty client terminal information has been received), the process proceeds to step S98.

At step S94, based on the client terminal information received from the user terminal Y, the user terminal X is connected to the client terminal currently connected to the user terminal Y.

At step S96, the CPU 21 transmits the connection completion signal to the user terminal Y, and then the process proceeds to step S90.

It is determined at step S98 whether the game start signal has been received from the host terminal (the user terminal Y). When the game start signal has been received, the client process ends, and the game starts. When the game start signal has not been received, the process proceeds to step S100.

It is determined at step S100 whether information about a user terminal (for convenience, hereinafter referred to a user terminal W), which newly participates as a client terminal in the game session created by the user terminal Y, has been received from the user terminal Y. When the information about the user terminal W has been received, the process proceeds to step S104. When the information about the user terminal W has not been received, the process proceeds to step S102.

At step S104, a connection between the user terminal X and the user terminal W is established based on the information about the user terminal W (e.g., an IP address). Then, the process returns to step S98.

It is determined at step S102 whether information (e.g., a terminal ID) about a user terminal, which, instead of the user terminal Y, becomes a new host terminal (for convenience, hereinafter referred to as a user terminal V), has been received from the user terminal Y. When such information about the user terminal V has been received, the process proceeds to step S104. When such information about the user terminal V has not been received, the process returns to step S98.

At step S104, the connection between the user terminal X and the current host terminal (the user terminal Y) is disconnected.

At step S106, the CPU 21 of the user terminal X transmits the terminal ID of the user terminal V, which has been received from the user terminal Y, to the address information server 10, and then obtains address information of the user terminal V (i.e., an IP address and a port number) from the address information server 10.

At step S108, the destination of the connection request is changed such that the user terminal V becomes a next destination of the connection request, and the client process ends. Then, the CPU 21 performs step S44 of FIG. 6. At step S20 after step S44, the connection request signal is transmitted to the user terminal V. At this point, it is highly probable that the response signal indicating "wait" is transmitted from the user terminal V since the user terminal Y has previously transmitted the connection request signal to the user terminal V. For this reason, it is preferred that the CPU 21 of the user terminal X repeatedly transmits, for a particular period of time, the connection request signal to the user terminal V. Note that, if the response signal indicating "rejection" has been received from the user terminal V for the reason that, for example, the number of client terminals connected to the user terminal V has reached a maximum number, the main process may be resumed again from step S10 shown in FIG. 6.

As a result of the above processes performed by the user terminal 20, when, for example, a game session in which two user terminals participate and another game session in which three user terminals participate are present at the same time, the connection request signal is transmitted from one host terminal to the other host terminal, and thereby these two game sessions are automatically merged into one game session (without causing users to be aware of such a merger). Thus, a peer-to-peer network is efficiently established.

Hereinafter, a manner to establish such a peer-to-peer network is described in detail with reference to FIGS. 9 to 36.

Figure 9:
FIG. 9 is a diagram showing a process of establishing a peer-to-peer network.
Figure 10:
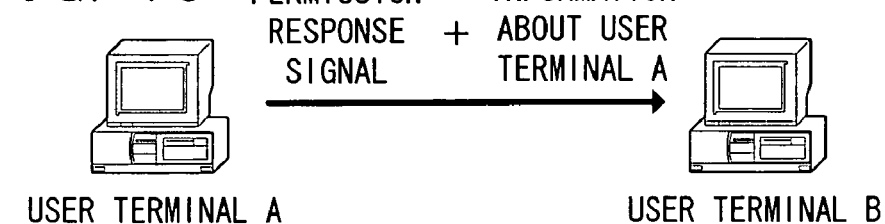
FIG. 10 is another diagram showing the process of establishing a peer-to-peer network.

First, as shown in FIG. 9, the connection request signal is transmitted from a user terminal B, which is not connected to any other user terminal, to a user terminal A which is also not connected to any other user terminal. In response, if the user terminal A can be connected to the user terminal B, the user terminal A transmits as shown in FIG. 10 to the user terminal B, detailed information (an IP address and a port number) used to search for the user terminal A which is the host terminal, and the number of client terminals currently connected to the user terminal A (here, "0"), together with the response signal indicating "permission".

Figure 11:
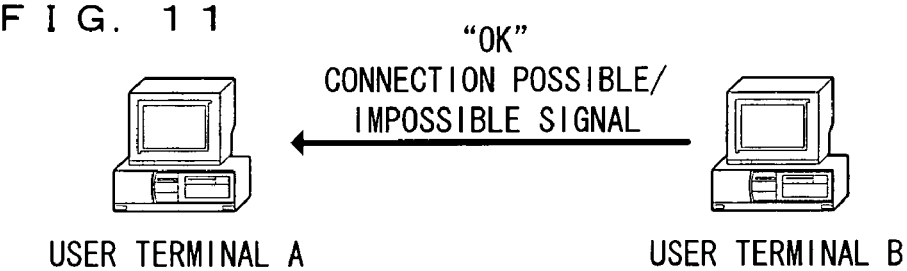
FIG. 11 is further another diagram showing the process of establishing a peer-to-peer network.
Figure 12:
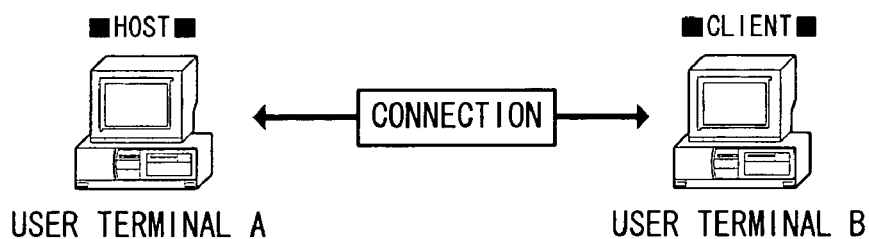
FIG. 12 is further another diagram showing the process of establishing a peer-to-peer network.
Figure 13:
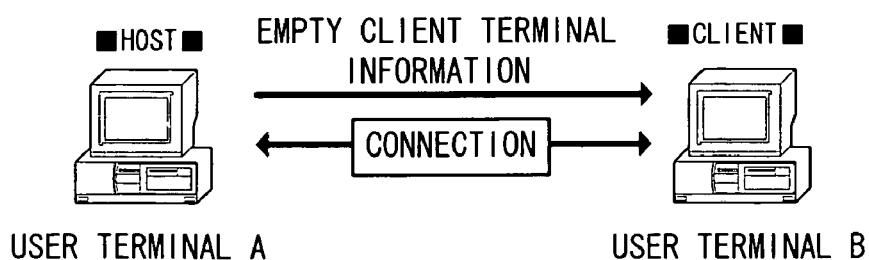
FIG. 13 is further another diagram showing the process of establishing a peer-to-peer network.

Then, as shown in FIG. 11, the connection possible/impossible signal indicating "OK" is transmitted from the user terminal B to the user terminal A. As a result, the user terminals A and B are connected as shown in FIG. 12. Consequently, the user terminal A becomes a host terminal, and the user terminal B becomes a client terminal.

Thereafter, the user terminal A transmits the empty client terminal information to the user terminal B, thereby allowing the user terminal B to recognize that there does not exist any other client terminal. Thus, a peer-to-peer network comprising the two user terminals, i.e., the user terminals A and B is established.

Figure 14:
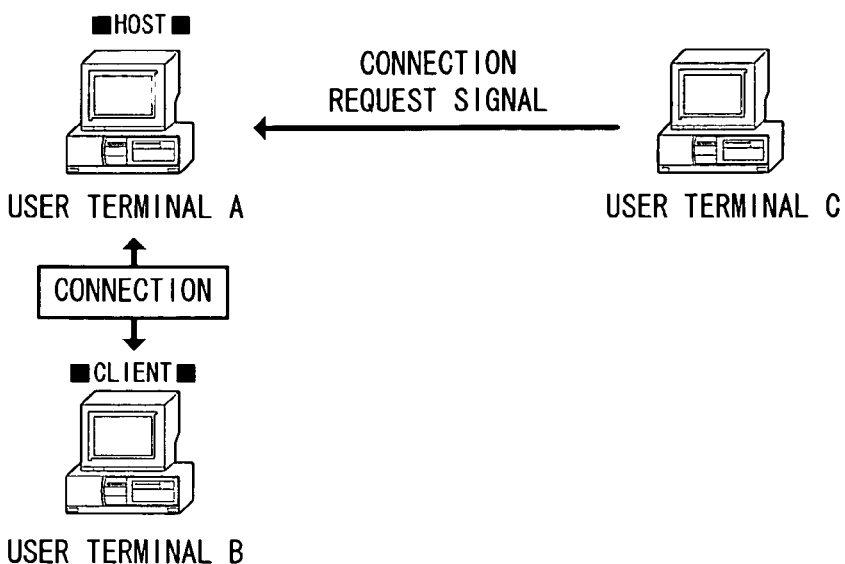
FIG. 14 is further another diagram showing the process of establishing a peer-to-peer network.
Figure 15:
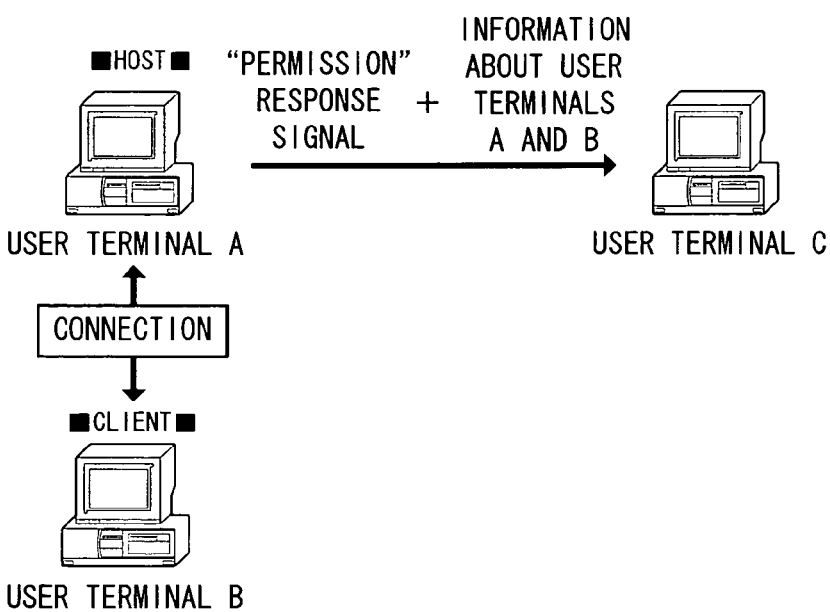
FIG. 15 is further another diagram showing the process of establishing a peer-to-peer network.

Next, as shown in FIG. 14, the connection request signal is newly transmitted from a user terminal C to the user terminal A. In response, if the user terminal A can be connected to the user terminal C, the user terminal A transmits as shown in FIG. 15 to the user terminal C, the detailed information (the IP address and port number) used to search for the user terminal A which is the host terminal, the number of client terminals currently connected to the user terminal A (here, the user terminal B is the only client terminal currently connected to the user terminal A, hence "1"), and a user ID of the currently-connected client terminal (user terminal B), together with the response signal indicating "permission".

Figure 16:
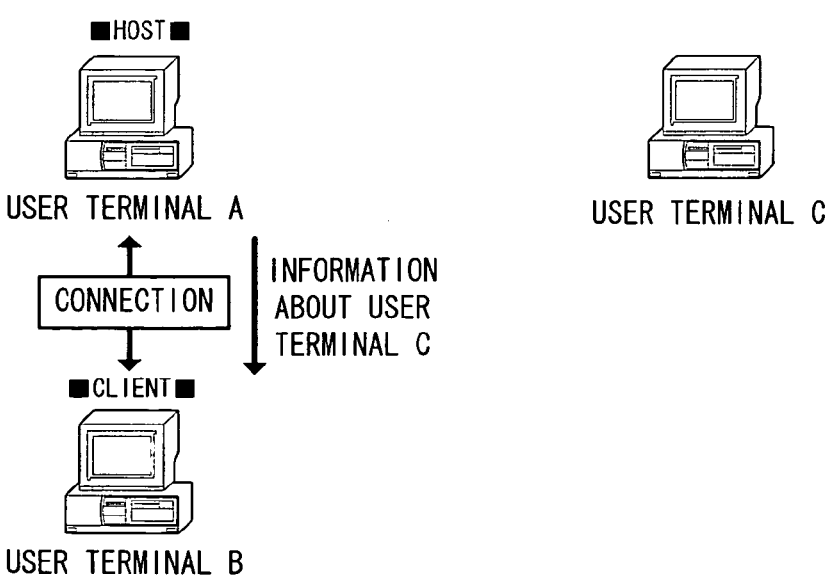
FIG. 16 is further another diagram showing the process of establishing a peer-to-peer network.

Next, as shown in FIG. 16, information about the user terminal C (such as an IP address) is transmitted from the user terminal A to the user terminal B.

Figure 17:
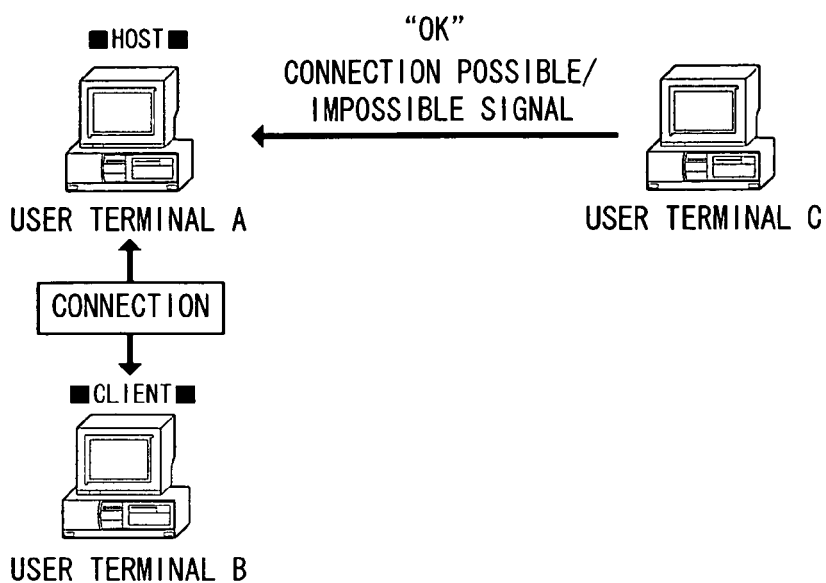
FIG. 17 is further another diagram showing the process of establishing a peer-to-peer network.
Figure 18:
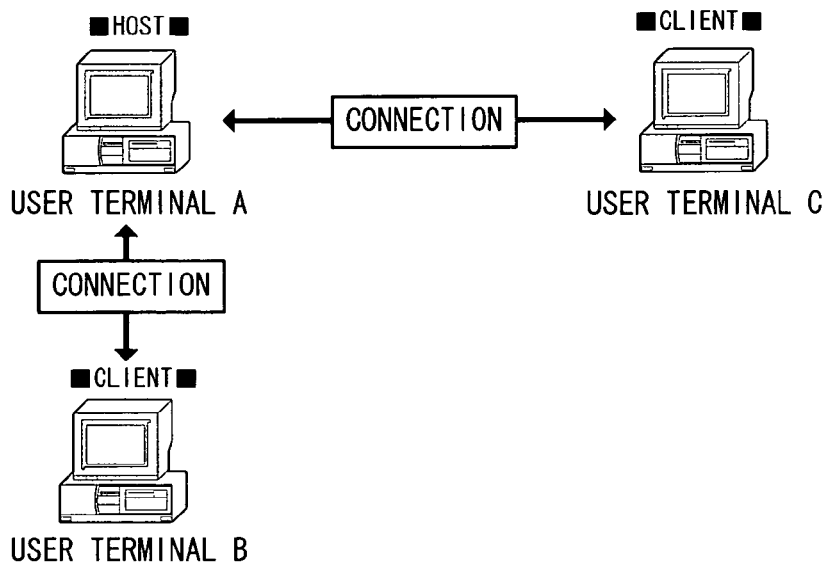
FIG. 18 is further another diagram showing the process of establishing a peer-to-peer network.

Then, as shown in FIG. 17, the connection possible/impossible signal indicating "OK" is transmitted from the user terminal C to the user terminal A. As a result, as shown in FIG. 18, the user terminals A and C are connected, and then the user terminal C becomes a client terminal.

Figure 19:
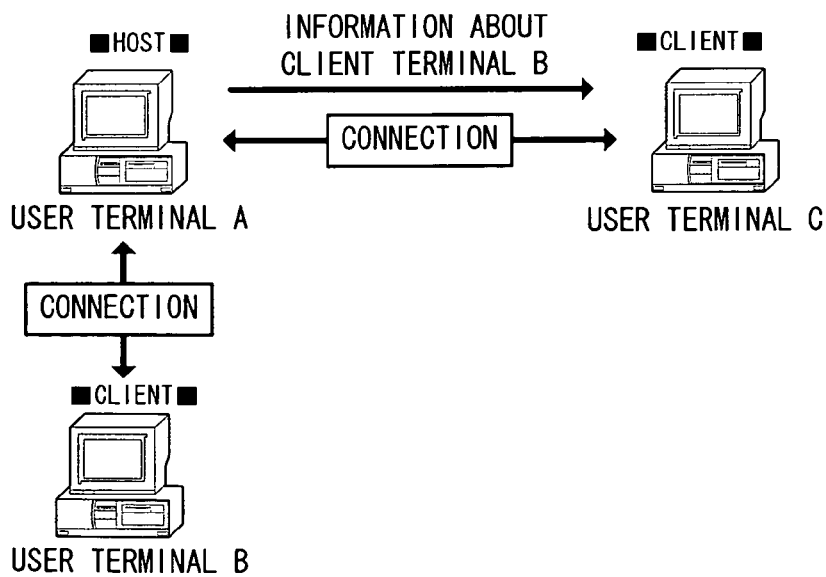
FIG. 19 is further another diagram showing the process of establishing a peer-to-peer network.
Figure 20:
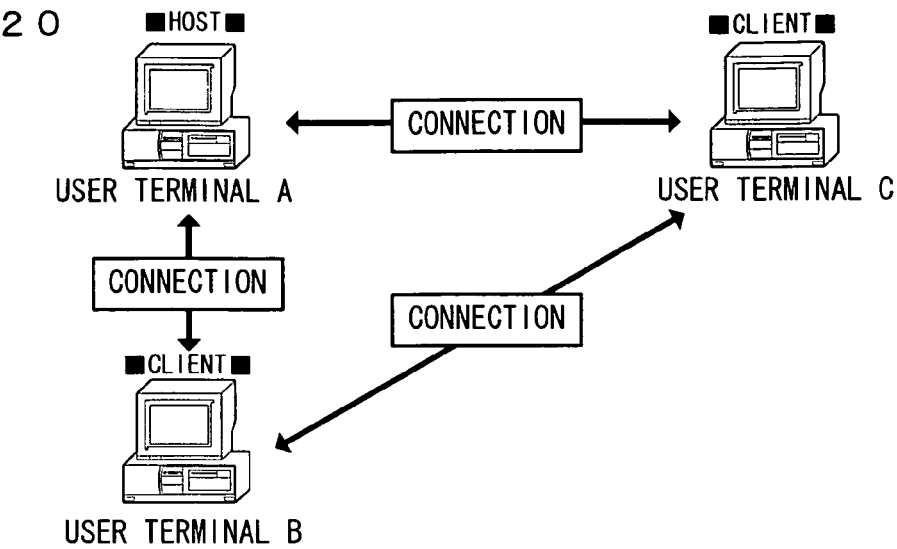
FIG. 20 is further another diagram showing the process of establishing a peer-to-peer network.

Thereafter, as shown in FIG. 19, information about the user terminal B (e.g., an IP address) is transmitted from the user terminal A to the user terminal C. Based on this information, the user terminals B and C are connected as shown in FIG. 20.

Figure 21:
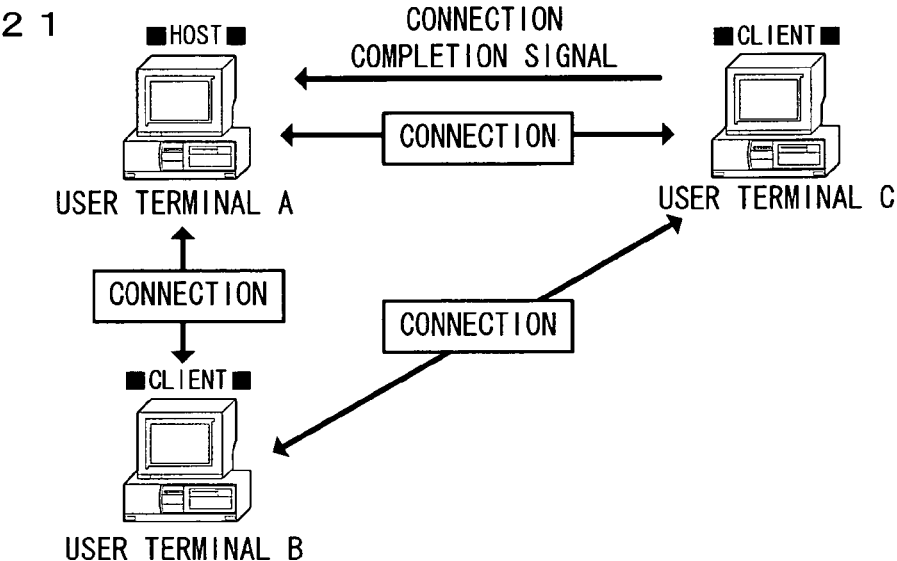
FIG. 21 is further another diagram showing the process of establishing a peer-to-peer network.
Figure 22:
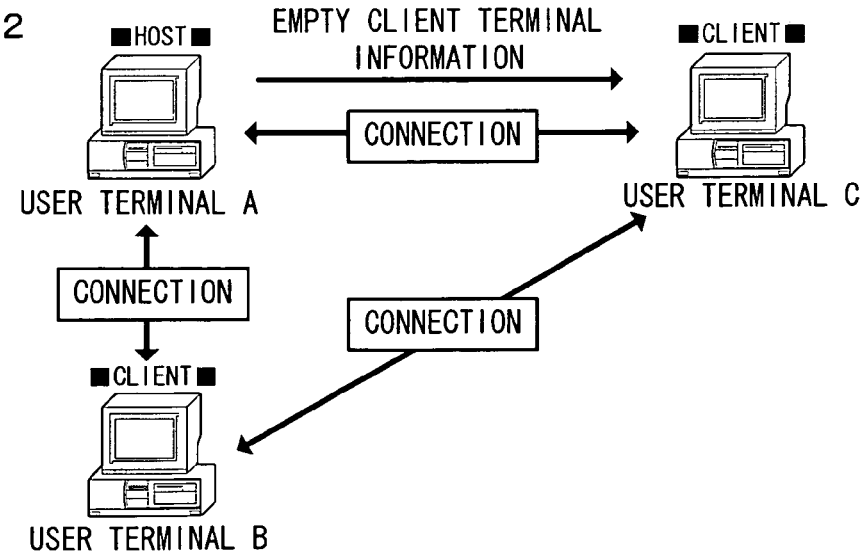
FIG. 22 is further another diagram showing the process of establishing a peer-to-peer network.

Then, as shown in FIG. 21, the connection completion signal is transmitted from the user terminal C to the user terminal A. In response, the user terminal A transmits the empty client terminal information to the user terminal C as shown in FIG. 22, thereby allowing the user terminal C to recognize that except for the user terminal C, the user terminal B is the only client terminal currently connected to the user terminal A.

Thus, a peer-to-peer network comprising the three user terminals, i.e., the user terminals A, B and C is established.

Figure 23:
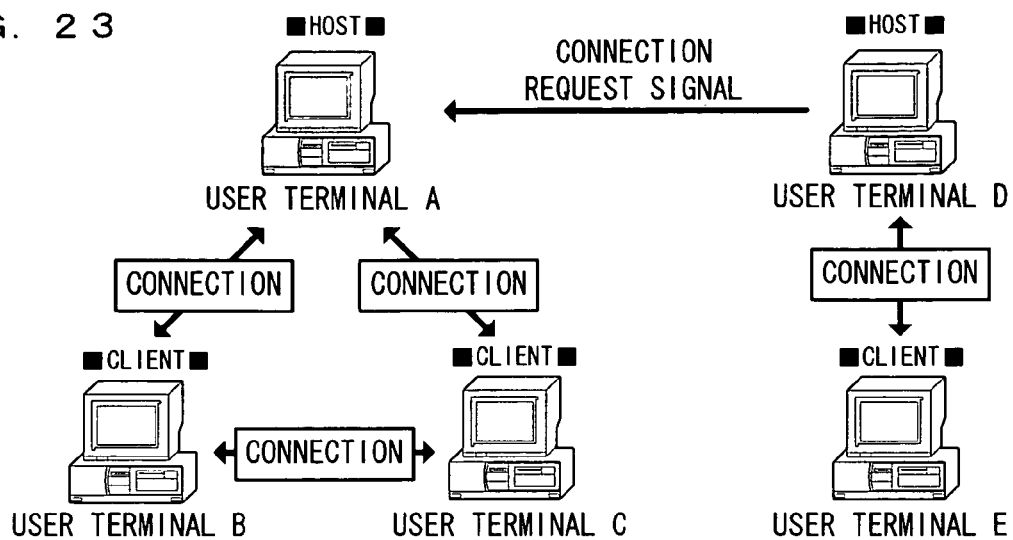
FIG. 23 is further another diagram showing the process of establishing a peer-to-peer network.
Figure 24:
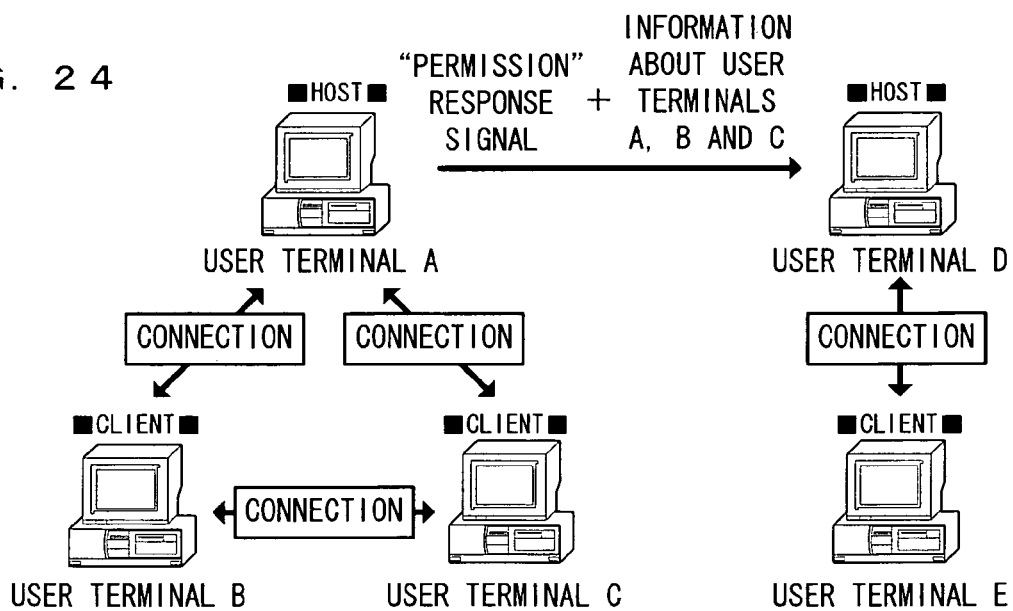
FIG. 24 is further another diagram showing the process of establishing a peer-to-peer network.

Next, as shown in FIG. 23, the connection request signal is transmitted to the user terminal A from a user terminal D which is a host terminal to which one client terminal (user terminal E) is currently connected. In response, if the user terminal A can be connected to the user terminal D, the user terminal A transmits as shown in FIG. 24 to the user terminal D, the detailed information (the IP address and port number) used to search for the user terminal A, the number of client terminals currently connected to the user terminal A (here, the user terminals B and C are the client terminals currently connected to the user terminal A, hence "2"), and a user ID of each of the currently-connected client terminals (here, a user ID of each of the user terminals B and C), together with the response signal indicating "permission".

Figure 25:
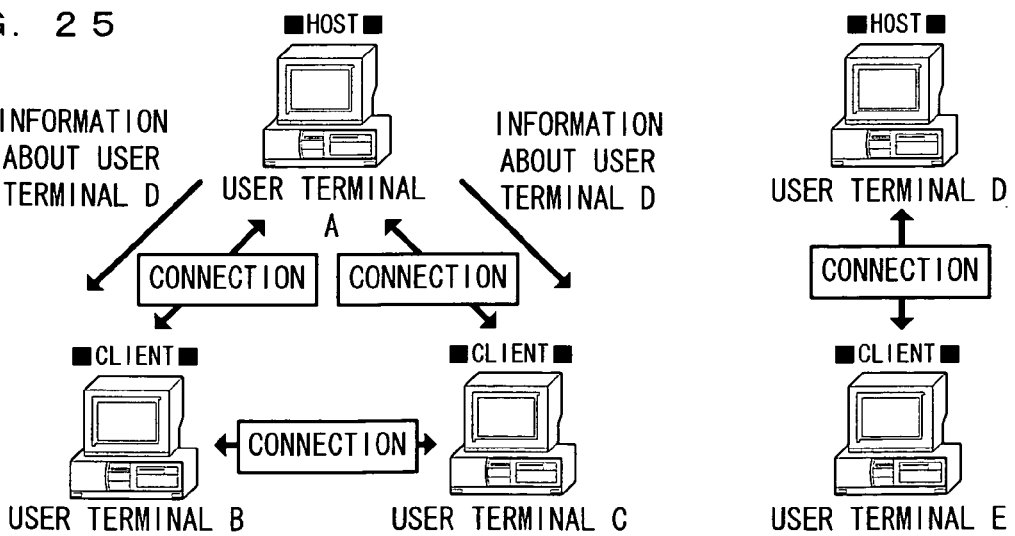
FIG. 25 is further another diagram showing the process of establishing a peer-to-peer network.

Then, as shown in FIG. 25, the user terminal A transmits information about the user terminal D (e.g., an IP address) to the user terminals B and C.

Figure 26:
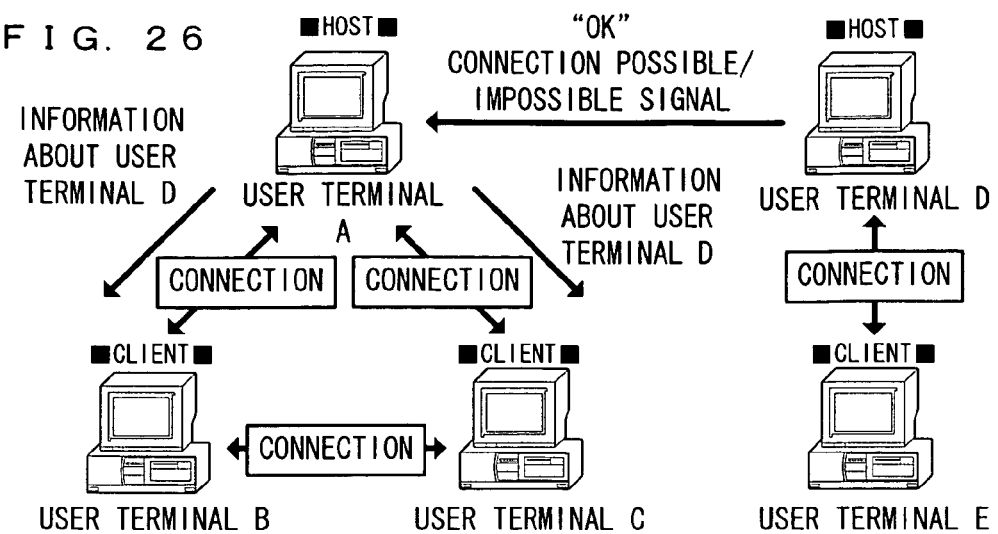
FIG. 26 is further another diagram showing the process of establishing a peer-to-peer network.
Figure 27:
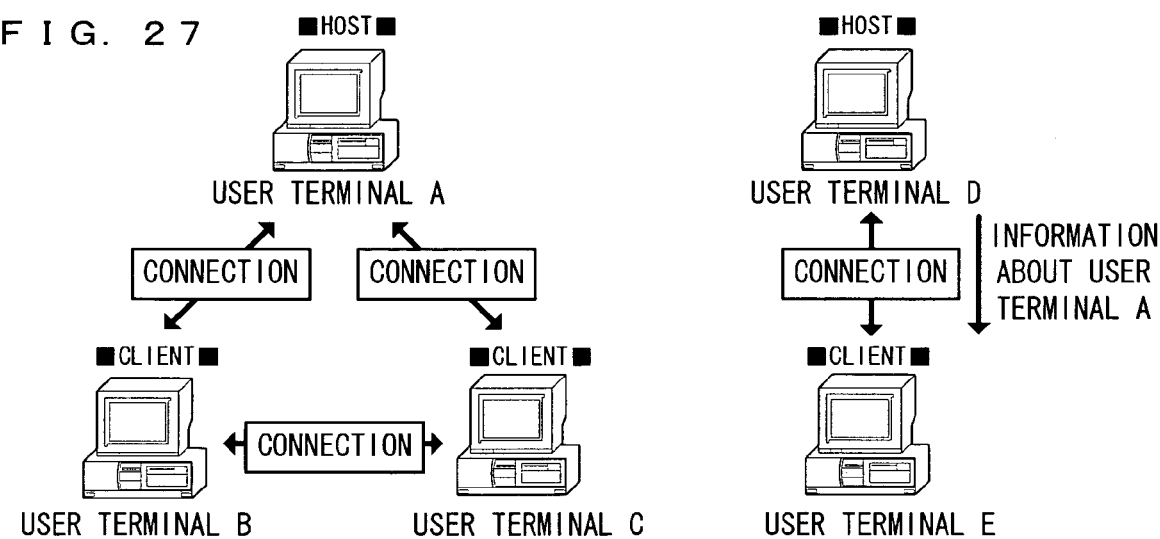
FIG. 27 is further another diagram showing the process of establishing a peer-to-peer network.
Figure 28:
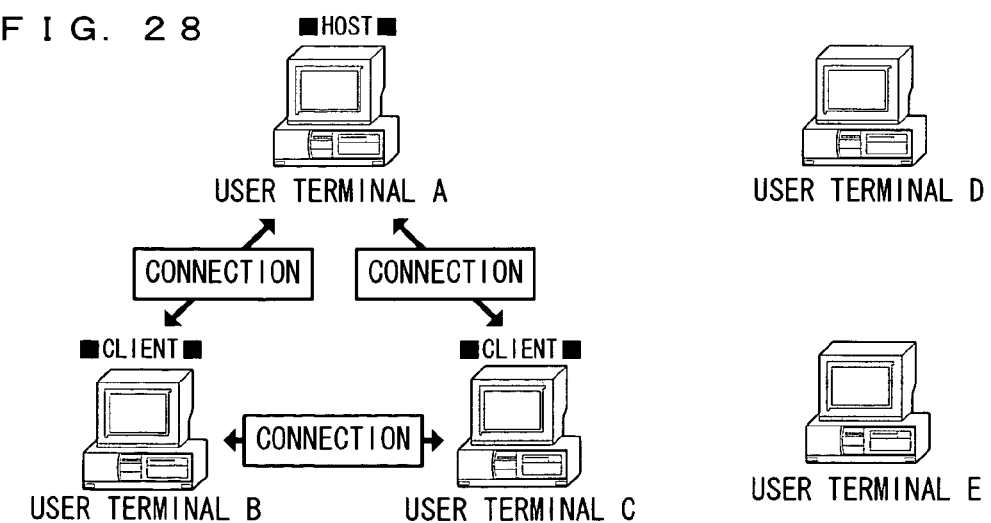
FIG. 28 is further another diagram showing the process of establishing a peer-to-peer network.
Figure 29:
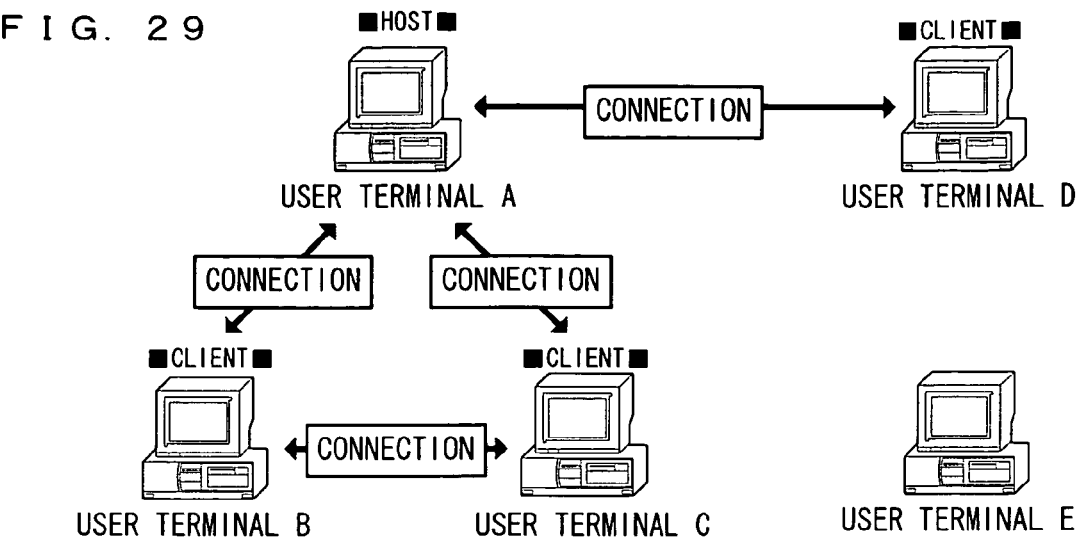
FIG. 29 is further another diagram showing the process of establishing a peer-to-peer network.

Subsequently, as shown in FIG. 26, the connection possible/impossible signal indicating "OK" is transmitted from the user terminal D to the user terminal A. Next, as shown in FIG. 27, information about the user terminal A (e.g., an IP address) is transmitted from the user terminal D to the user terminal E. Then, as shown in FIG. 28, the connection between the user terminals D and E is disconnected, and as a result, the user terminal E is no longer a client terminal. Thereafter, as shown in FIG. 29, the user terminals A and D are connected, and the user terminal D becomes a client terminal.

Figure 30:
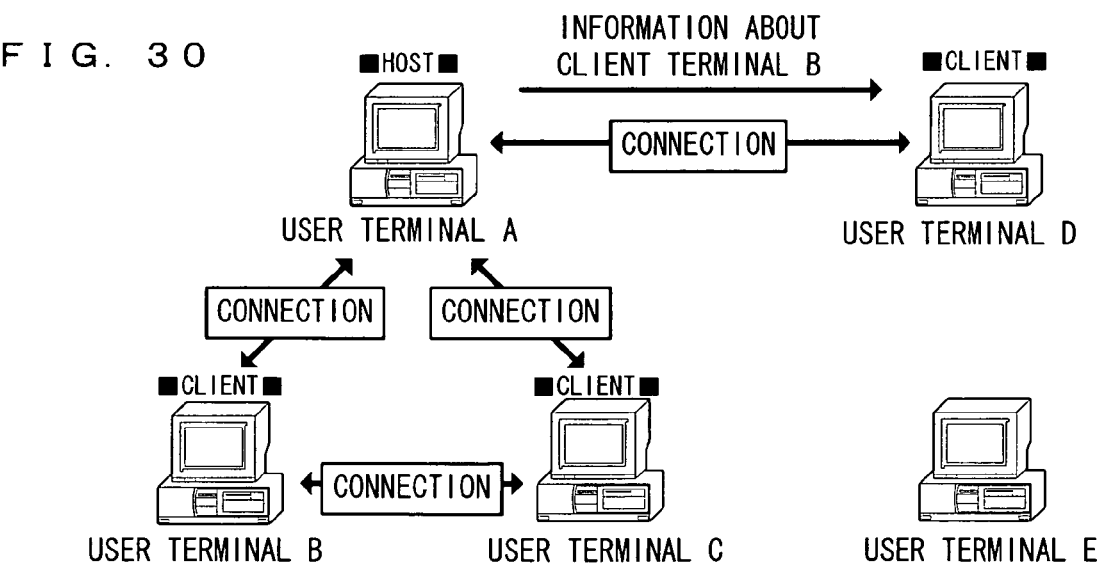
FIG. 30 is further another diagram showing the process of establishing a peer-to-peer network.
Figure 31:
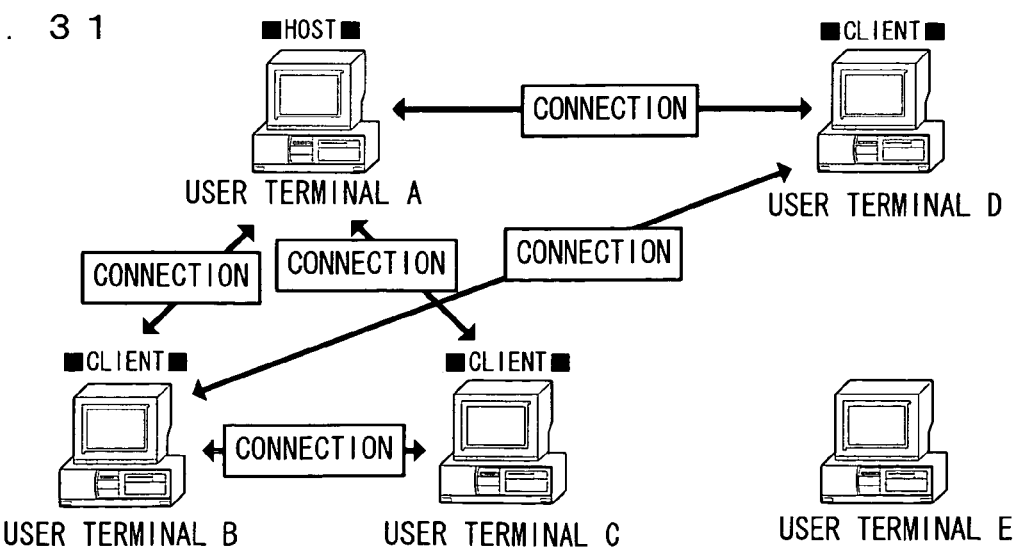
FIG. 31 is further another diagram showing the process of establishing a peer-to-peer network.

Then, as shown in FIG. 30, information about the user terminal B (such as an IP address) is transmitted from the user terminal A to the user terminal D. Based on this information, the user terminals B and D are connected as shown in FIG. 31.

Figure 32:
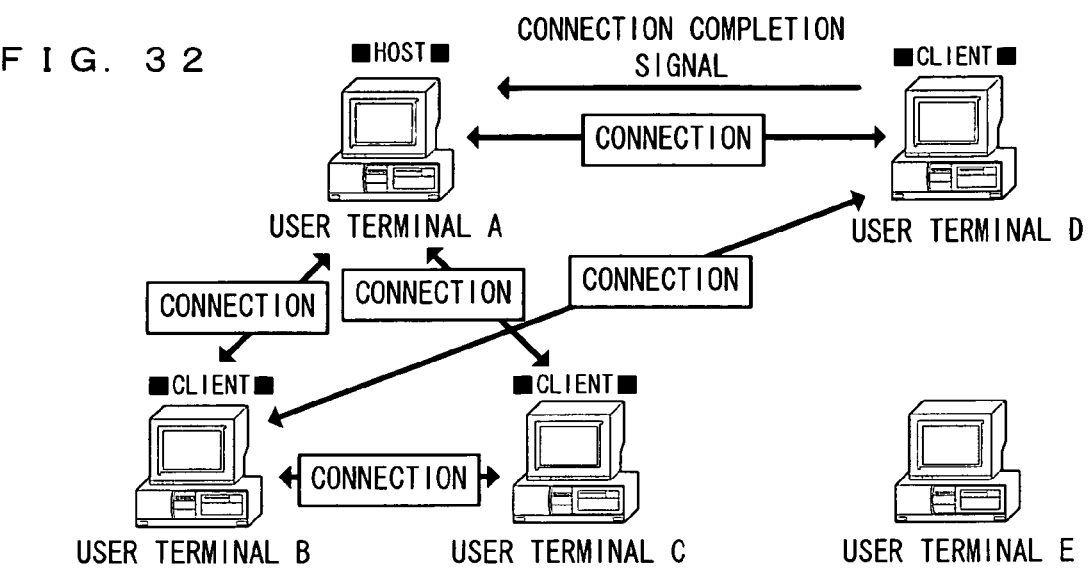
FIG. 32 is further another diagram showing the process of establishing a peer-to-peer network.
Figure 33:
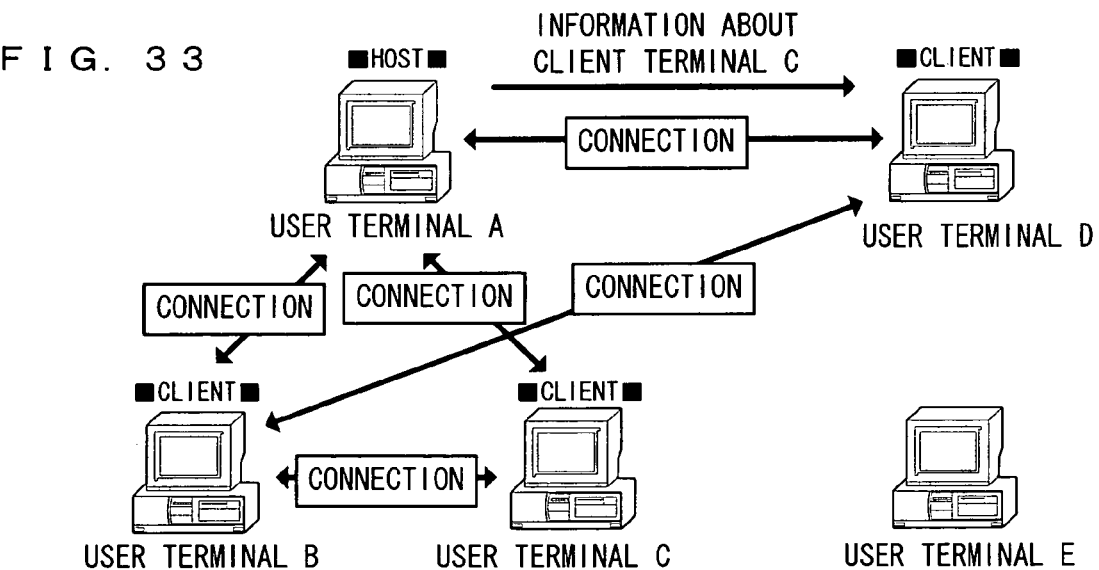
FIG. 33 is further another diagram showing the process of establishing a peer-to-peer network.
Figure 34:
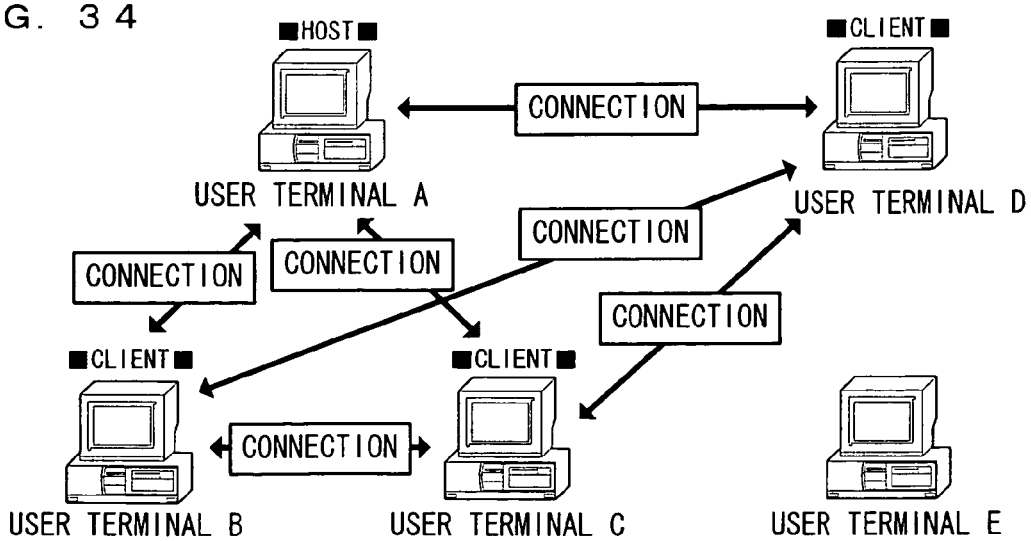
FIG. 34 is further another diagram showing the process of establishing a peer-to-peer network.
Figure 38:
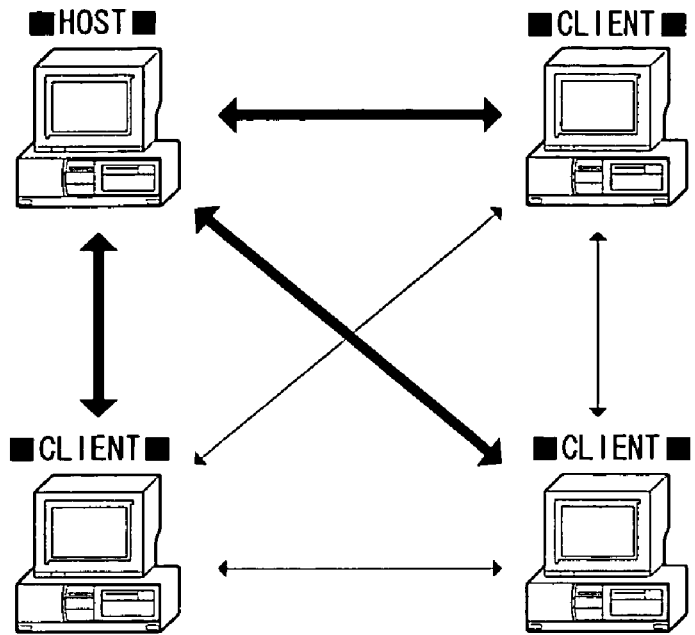
FIG. 38 is an exemplary configuration of a conventional peer-to-peer network game system.
Figure 39:
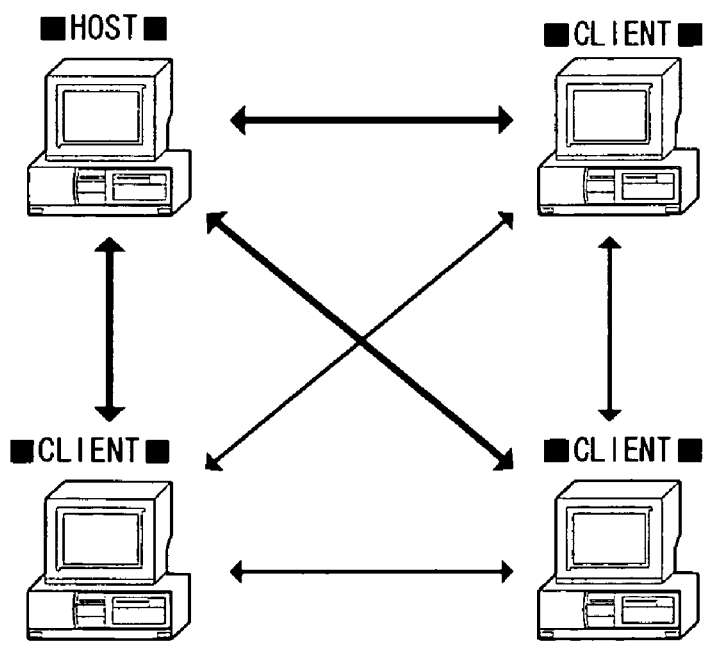
FIG. 39 is another exemplary configuration of a conventional peer-to-peer network game system.

Subsequently, as shown in FIG. 32, the connection completion signal is transmitted from the user terminal D to the user terminal A. In response, as shown in FIG. 33, the user terminal A transmits information about the user terminal C (e.g., an IP address) to the user terminal D. Based on this information, the user terminals C and D are connected as shown in FIG. 34.

Thereafter, as shown in FIG. 35, the connection completion signal is transmitted from the user terminal D to the user terminal A. In response, the user terminal A transmits the empty client terminal information to the user terminal D as shown in FIG. 36, thereby allowing the user terminal D to recognize that except for the user terminal D, the user terminals B and C are the only client terminals currently connected to the user terminal A.

Thus, a peer-to-peer network comprising the four user terminals, i.e., the user terminals A, B, C and D, is established.

Thereafter, based on the information about the user terminal A which has been received from the user terminal D as shown in FIG. 27, the user terminal E transmits the connection request signal to the user terminal A as shown in FIG. 37. Then, after the above-described processes are performed for the user terminal E, a peer-to-peer network comprising the five user terminals, i.e., the user terminals A, B, C, D and E, is established.

As described above, according to the present embodiment, in the case where there exist, as shown in FIG. 23, a plurality of independent peer-to-peer networks at the same time, in each of which a game such as a racing game cannot be started since the number of user terminals has not reached a predetermined number (e.g., "5"), a peer-to-peer network comprising the predetermined number of user terminals is automatically and quickly established by the manner in which a host terminal of one of the plurality of peer-to-peer networks transmits a connection request signal to a host terminal of another of the plurality of peer-to-peer networks, thereby changing into a client terminal. Consequently, a time during which players wait for a network game to start is greatly reduced.

In the present embodiment, a manner of determining the destination of the connection request signal is as follows: first, the address information list is obtained from the address information server 10; and, on the user terminal side, the destination of the connection request signal is determined based on the address information list. This allows the destination of the connection to be determined in accordance with various indicators while preventing an increase of the load on the address information server 10. Further, by randomly determining on the user terminal side the destination of the connection request signal, connection request signals are prevented from concurrently flooding into a particular host terminal on a network. This consequently allows a large number of peer-to-peer networks to be established in a quick manner.

Further, in the present embodiment, an interval between each transmission of the connection request signal is lengthened as the number of client terminals connected to the host terminal increases. For this reason, in the case where a peer-to-peer network comprising a necessary number of user terminals for playing a game can be established by adding one more client terminal to the network, a frequency of transmission of the connection request signal from a host terminal of the network to another host terminal is suppressed. This increases a probability that the connection request signal is transmitted from a host terminal of a peer-to-peer network comprising a small number of user terminals to a host terminal of another peer-to-peer network comprising a small number of user terminals. Consequently, a peer-to-peer network comprising a necessary number of user terminals for playing a game is efficiently established.

The present embodiment has described an example in which when, as shown in FIG. 26, a preparation for establishing the connection between the user terminals A and D is completed, the connection between the user terminals D and E is disconnected as shown in FIG. 28. However, in a modification example above, in order to establish a peer-to-peer network comprising the five user terminals, i.e., the user terminals A, B, C, D and E, connections may be sequentially established between the user terminal E, and the user terminals A, B and C while keeping the connection between the user terminals D and E.

While certain exemplary embodiments have been described in detail, the foregoing description is in all aspects illustrative and not restrictive. It is understood that numerous other modifications and variations can be devised without departing from the scope of the invention.

What is claimed is:

1. A network game system comprising a plurality of game devices connected to each other via a network, each of which is capable of, in a game device group formed by one host terminal and at least one client terminal, operating as the host terminal or the client terminal, each of the game devices, which constitutes the network game system, including:
- a fundamental connection request transmitter configured to, when said each of the game devices does not belong to any game device group, transmit a fundamental connection request to another game device;
- a fundamental connection request receiver configured to receive the fundamental connection request from still another game device;
- an acceptance determiner configured to determine whether or not to accept the fundamental connection request received by the fundamental connection request receiver;
- a first host processor configured to, when said each of the game devices does not belong to any game device group and a determination result provided by the acceptance determiner is positive, transmit an acceptance notification to said still another game device which is a source of the fundamental connection request received by the fundamental connection request receiver, and causing said each of the game devices to operate as a host terminal of a game device group including at least said each of the game devices and said still another game device which is the source of the fundamental connection request received by the fundamental connection request receiver;
- a permission notifier configured to, when said each of the game devices is operating as a host terminal and a determination result provided by the acceptance determiner is positive, transmitting the acceptance notification to said still another game device which is the source of the fundamental connection request received by the fundamental connection request receiver;
- a client processor configured to, when the acceptance notification is received from said another game device in response to the fundamental connection request transmitted by the fundamental connection request transmitter, cause said each of the game devices to operate as a client terminal subordinate to said another game device having accepted the fundamental connection request;
- a host connection request transmitter configured to, when said each of the game devices is operating as a host terminal, transmit a host connection request to any other game device;
- a host connection request receiver for receiving the host connection request from any host terminal;
- a host acceptance determiner configured to determine whether or not to accept the host connection request received by the host connection request receiver;
- a second host processor configured to, when said each of the game devices does not belong to any game device group and a determination result provided by the host acceptance determiner is positive, transmitting a host acceptance notification to said any host terminal which is a source of the host connection request received by the host connection request receiver, and causing said each of the game devices to operate as a host terminal of a game device group including at least said each of the game devices and a game device having previously operated as said any host terminal which is the source of the host connection request received by the host connection request receiver;
- a host permission notifier configured to, when said each of the game devices is operating as a host terminal and a determination result provided by the host acceptance determiner is positive, transmit the host acceptance notification to said any host terminal which is the source of the host connection request received by the host connection request receiver;
- a dispersion processor configured to, when the host acceptance notification is received from said any other game device in response to the host connection request transmitted by the host connection request transmitter, transmit a dispersion notification to a client terminal of a game device group to which said each of the game devices belongs, and causing said each of the game devices to operate as a client terminal subordinate to said any other game device having accepted the host connection request; and an address information server including:
- a game device information collector configured to collect, from each of the game devices connected to the network, game device information containing address information for accessing at least said each of the game devices, and to store the game device information in a storage section, and
- an address information transmitter configured to, in response to an address information acquisition request from one of the game devices connected to the network, transmit, to said one of the game devices, address information about at least one game device which is different from said one of the game devices from among address information about the game devices which has been collected by the game device information collector, wherein the network is the Internet.

2. The network game system according to claim 1, wherein the host connection request transmitter of each of the game devices transmits the host connection request to another host terminal only when a number of client terminals of a game device group, to which said each of the game devices belongs, has not reached a predetermined number.

3. The network game system according to claim 1 wherein the host connection request transmitter of each of the game devices changes, based on a number of client terminals of a game device group to which said each of the game devices belongs, an interval between each transmission of the host connection request to another game device.

4. The network game system according to claim 1 wherein the host connection request transmitter of each of the game devices lengthens an interval between each transmission of the host connection request to another host terminal, in accordance with an increase in a number of client terminals of a game device group, to which said each of the game devices belongs.

5. The network game system according to claim 1, wherein
- the address information transmitter, in response to the address information acquisition request from one of the game devices connected to the network, transmits, to said one of the game devices, an address information list containing the address information about the game devices except said one of the game devices,
- each of the game devices further includes:
  - an address information list requester configured to request the address information list from the address information server;
  - an address information list receiver configured to receive the address information list from the address information server; and an address information extractor configured to randomly extract one piece of address information from the address information list received by the address information list receiver, and the fundamental connection request transmitter of each of the game devices transmits, by using the one piece of address information randomly extracted by the address information extractor, the fundamental connection request to a game device corresponding to the one piece of address information.

6. The network game system according to claim 5, wherein the address information transmitter, in response to the address information acquisition request from a host terminal connected to the network, transmits, to the host terminal, the address information list containing address information about a plurality of other host terminals, each of the game devices further includes:
the address information list requester configured to request the address information list from the address information server;
the address information list receiver configured to receive the address information list from the address information server; and
the address information extractor configured to, based on a predetermined indicator contained in each piece of address information in the address information list received by the address information list receiver, extract one piece of address information from the address information list, and the host connection request transmitter of each of the game devices transmits, by using the one piece of address information extracted by the address information extractor, a host connection request to a host terminal corresponding to the one piece of address information.

7. The network game system according to claim 6, wherein in the case where a plurality of pieces of address information are extracted, based on the predetermined indicator, from the address information list received by the address information list receiver, the address information extractor randomly extracts one piece of address information from among the plurality of pieces of extracted address information.

8. The network game system according to claim 5, wherein the address information transmitter, in response to the address information acquisition request from a host terminal connected to the network, transmits, to the host terminal, the address information list containing address information about a plurality of other host terminals, each of the game devices further includes:
the address information list requester configured to request the address information list from the address information server;
the address information list receiver configured to receive the address information list from the address information server; and
the address information extractor configured to randomly extract one piece of address information from the address information list received by the address information list receiver, and the host connection request transmitter of each of the game devices transmits, by using the one piece of address information randomly extracted by the address information extractor, a host connection request to a host terminal corresponding to the one piece of address information.

9. The network game system according to claim 1, wherein when, after the fundamental connection request transmitter has transmitted a fundamental connection request to a first other game device and before an acceptance or a rejection of the fundamental connection request is notified, the fundamental connection request receiver receives a fundamental connection request from a second other game device, the acceptance determiner determines based on a predetermined criterion whether or not to accept the fundamental connection request from the second other game device, and each of the game devices further includes a cancellation signal transmitter for, when a determination result provided by the acceptance determiner is positive, transmitting a cancellation signal to the first other game device.

10. The network game system according to claim 9, wherein the acceptance determiner determines, by comparing an identifier associated with the first other game device with an identifier associated with the second other game device, whether or not to accept the fundamental connection request from the second other game device.

11. A non-transitory computer-readable storage medium storing a network game program used in a network game system comprising a plurality of game devices connected to each other via a network, each of which is capable of, in a game device group formed by one host terminal and at least one client terminal, operating as the host terminal or the client terminal, the network game program causing a computer of each of the game devices to function as:

a fundamental connection request transmitter configured to, when said each of the game devices does not belong to any game device group, transmit a fundamental connection request to another game device;

a fundamental connection request receiver configured to receive the fundamental connection request from still another game device;

an acceptance determiner configured to determine whether or not to accept the fundamental connection request received by the fundamental connection request receiver;

a first host processor configured to, when said each of the game devices does not belong to any game device group and a determination result provided by the acceptance determiner is positive, transmit an acceptance notification to said still another game device which is a source of the fundamental connection request received by the fundamental connection request receiver, and to cause said each of the game devices to operate as a host terminal of a game device group including at least said each of the game devices and said still another game device which is the source of the fundamental connection request received by the fundamental connection request receiver;

a permission notifier configured to, when said each of the game devices is operating as a host terminal and a determination result provided by the acceptance determiner is positive, transmit the acceptance notification to said still another game device which is the source of the fundamental connection request received by the fundamental connection request receiver;

a client processor configured to, when the acceptance notification is received from said another game device in response to the fundamental connection request transmitted by the fundamental connection request transmitter, cause said each of the game devices to operate as a client terminal subordinate to said another game device having accepted the fundamental connection request;

a host connection request transmitter configured to, when said each of the game devices is operating as a host terminal, transmit a host connection request to any other game device;

a host connection request receiver configured to receive the host connection request from any host terminal;

a host acceptance determiner configured to determine whether or not to accept the host connection request received by the host connection request receiver;

a second host processor configured to, when said each of the game devices does not belong to any game device group and a determination result provided by the host acceptance determiner is positive, transmit a host acceptance notification to said any host terminal which is a source of the host connection request received by the host connection request receiver, and to cause said each of the game devices to operate as a host terminal of a game device group including at least said each of the game devices and a game device having previously operated as said any host terminal which is the source of the host connection request received by the host connection request receiver;

a host permission notifier configured to, when said each of the game devices is operating as a host terminal and a determination result provided by the host acceptance determiner is positive, transmit the host acceptance notification to said any host terminal which is the source of the host connection request received by the host connection request receiver;

a dispersion processor configured to, when the host acceptance notification is received from said any other game device in response to the host connection request transmitted by the host connection request transmitter, transmit a dispersion notification to a client terminal of a game device group to which said each of the game devices belongs, and causing said each of the game devices to operate as a client terminal subordinate to said any other game device having accepted the host connection request; and an address information server including:

a game device information collector configured to collect, from each of the game devices connected to the network, game device information containing address information for accessing at least said each of the game devices, and to store the game device information in a storage section, and an address information transmitter configured to, in response to an address information acquisition request from one of the game devices connected to the network, transmit, to said one of the game devices, address information about at least one game device which is different from said one of the game devices from among address information about the game devices which has been collected by the game device information collector, wherein the network is the Internet.

12. A method of providing a network game system comprising a plurality of game devices connected to each other via a network, each of which is capable of, in a game device group formed by one host terminal and at least one client terminal, operating as the host terminal or the client terminal, comprising:

transmitting a fundamental connection request to another game device when said each of the game devices does not belong to any game device group;

receiving the fundamental connection request from still another game device;

determining whether or not to accept the received fundamental connection request;

transmitting, when said each of the game devices does not belong to any game device group and a determination result is positive, an acceptance notification to said still another game device which is a source of the received fundamental connection request, and causing said each of the game devices to operate as a host terminal of a game device group including at least said each of the game devices and said still another game device which is the source of the received fundamental connection request;

transmitting, when said each of the game devices is operating as a host terminal and a determination result is positive, the acceptance notification to said still another game device which is the source of the received fundamental connection request;

causing said each of the game devices to operate as a client terminal subordinate to said another game device having accepted the fundamental connection request when the acceptance notification is received from said another game device in response to the transmitted fundamental connection request;

transmitting a host connection request to any other game device when said each of the game devices is operating as a host terminal;

receiving the host connection request from any host terminal;

determining whether or not to accept the received host connection request;

transmitting a host acceptance notification to said any host terminal which is a source of the received host connection request and causing said each of the game devices to operate as a host terminal of a game device group including at least said each of the game devices and a game device having previously operated as said any host terminal which is the source of the received host connection request received when said each of the game devices does not belong to any game device group and a determination result is positive;

transmitting the host acceptance notification to said any host terminal which is the source of the received host connection request when said each of the game devices is operating as a host terminal and a determination result is positive;

transmitting a dispersion notification to a client terminal of a game device group to which said each of the game devices belongs and causing said each of the game devices to operate as a client terminal subordinate to said any other game device having accepted the host connection request when the host acceptance notification is received from said any other game device in response to the transmitted host connection request;

collecting game device information from each of the game devices connected to the network containing address information for accessing at least said each of the game devices, and storing the game device information in a storage section;

transmitting to said one of the game devices, in response to an address information acquisition request from one of the game devices connected to the network, address information about at least one game device which is different from said one of the game devices from among collected address information about the game devices, wherein the network is the Internet.

* * * * *